US007046964B1

(12) United States Patent
Sullivan et al.

(10) Patent No.: US 7,046,964 B1
(45) Date of Patent: May 16, 2006

(54) METHOD AND APPARATUS FOR DETERMINING THE FREQUENCY OF A RADIO SIGNAL DURING PERIODS OF STABILITY AND MONITORING COMMUNICATIONS WITH A RADIO RECEIVER

(75) Inventors: Terence Sean Sullivan, Cambridge, MA (US); Terence Brennan, Melbourne, FL (US); Richard Barnett, Needham, MA (US)

(73) Assignee: Counter Technologies, LLC, Ely, NV (US)

( * ) Notice: Subject to any disclaimer, the term of this patent is extended or adjusted under 35 U.S.C. 154(b) by 0 days.

(21) Appl. No.: 11/003,460

(22) Filed: Dec. 6, 2004

Related U.S. Application Data

(63) Continuation-in-part of application No. 09/860,506, filed on May 21, 2001.

(60) Provisional application No. 60/526,983, filed on Dec. 5, 2003, provisional application No. 60/599,018, filed on Aug. 6, 2004.

(51) Int. Cl.
*H04B 17/00* (2006.01)
*H04B 1/18* (2006.01)

(52) U.S. Cl. ............... 455/67.11; 455/67.13; 455/158.3; 455/266.4; 375/360; 375/375; 327/48

(58) Field of Classification Search ............. 455/67.11, 455/67.13, 158.3, 161.1, 226.4, 214–215, 455/336; 375/360, 375; 327/47–48
See application file for complete search history.

(56) References Cited

U.S. PATENT DOCUMENTS 4,350,950 A     9/1982   Waldmann et al.
4,651,089 A *   3/1987   Haigh ..................... 324/76.42
4,727,591 A     2/1988   Manlove
5,457,716 A *   10/1995  Ang et al. .................. 375/344
5,471,402 A     11/1995  Owen
RE35,296 E *    7/1996   Ladas et al. .................. 327/48
5,613,232 A     3/1997   Toshida et al.
5,710,710 A     1/1998   Owen et al.
5,940,748 A *   8/1999   Daughtry et al. ........ 455/182.2
5,943,606 A     8/1999   Kremm et al.
6,023,615 A     2/2000   Bruckert et al.
6,137,844 A *   10/2000  Maresca ..................... 375/340
6,246,267 B1 *  6/2001   Barsoum et al. .............. 327/13
6,335,953 B1    1/2002   Sanderford et al.

* cited by examiner

*Primary Examiner*—Simon Nguyen
(74) *Attorney, Agent, or Firm*—Leydig, Voit & Mayer, Ltd.

(57) ABSTRACT

A method and apparatus provide for monitoring radio frequency signals and, in conjunction with the monitoring, determining frequency of a received dominant radio frequency signal. Zero amplitude transitions of the signal are counted in primary and secondary sampling periods to determine frequency and frequency stability. The method and apparatus can be used to tune to radio frequency signals having frequencies in a list of frequencies to be monitored and detecting signals in the radio frequency spectrum on other frequencies. The monitoring and scanning may occur simultaneously, sequentially, or in any order or sequence. The frequencies of dominant signals received are determined and added to the list for monitoring. The receiver may be tuned to a frequency determined immediately upon determination of the frequency determined, after storage of the frequency determined, only after a signal on the currently monitored frequency terminates, or upon other conditions. A user of the apparatus can build a list of frequencies to be monitored automatically without sophisticated knowledge or equipment.

38 Claims, 11 Drawing Sheets

METHOD AND APPARATUS FOR DETERMINING THE FREQUENCY OF A RADIO SIGNAL DURING PERIODS OF STABILITY AND MONITORING COMMUNICATIONS WITH A RADIO RECEIVER

This disclosure is a continuation-in-part of U.S. patent application Ser. No. 09/860,506 filed May 21, 2001 and claims the priority of U.S. Patent Applications 60/526,983 filed Dec. 5, 2003, and 60/599,018 filed Aug. 6, 2004.

FIELD OF THE INVENTION

The invention concerns an apparatus and method for determining the frequency of an electrical signal, such as a dominant radio frequency signal. In one aspect, this invention further concerns storing in a memory information identifying this frequency, scanning for radio frequency signals at frequencies identified in the memory, with a frequency agile radio receiver or transceiver, and continuing the determination of dominant radio frequencies concurrent with scanning for radio frequency signals. By detecting and storing frequencies and scanning for signals at the frequencies of dominant radio signals, communications on frequencies with even briefly dominant radio signals can be joined in progress, and can continue to be monitored as the detected radio signal fades.

BACKGROUND

Apparatus for determining the frequency of an electrical signal has long been known. A conventional apparatus for determining the frequency is usually referred to as a frequency counter and frequently includes a visual display showing in digital form the frequency measured. The apparatus typically counts the number of cycles of an incoming signal during a sampling period.

Frequency counters typically operate by counting voltage transitions on an electrical line across a zero amplitude threshold, where this electrical line carries the sum of all signal and noise sources contributing to an electrical input (for example, a radio antenna). If no single signal has sufficient strength to dominate the sum of all signal and noise sources on this electrical line, then a frequency determined in this manner will not correspond to the frequency of any individual signal. A frequency determination is only "valid" if a single signal is dominant to all other signals and noise present on the electrical line during the sampling period used to determine frequency.

To eliminate "false readings" of determined frequencies that do not correspond to the frequency of a real signal, prior art frequency counters have used several techniques to validate a frequency determination.

Some prior art frequency counters suppress a frequency report unless the same frequency is determined during a plurality of successive sampling periods. However, this method forces a delay in reporting the frequency of a new signal, for the duration of multiple sampling periods of sufficient length to determine the frequency individually. In addition, this method is not capable of reporting the frequency of a signal which is dominant for a shorter interval than multiple sampling periods, as is often true for weaker radio signals that achieve dominance only during very brief periods of optimal reception conditions.

Other prior art frequency counters suppress a frequency report unless signal strength measurements have indicated a sudden rise in total signal strength, presumably indicating the start of a radio signal of greater strength than all other sources combined. However, this method is not capable of reporting the frequency of a signal which is near the strength threshold for dominance, and is not capable of reporting the frequency of a signal which is continuously active. In addition, this method requires additional signal strength measurement apparatus.

Accordingly, there is a need for a frequency determination apparatus that verifies the presence of a dominant signal during the sampling period used to determine the frequency of this signal, and is sensitive to signals that are near the dominance threshold for signal strength, without dependence upon a sudden change in total signal strength.

Frequency agile radio receivers are available that allow a listener to monitor conversations on each of numerous fixed frequencies. These receivers may monitor fixed frequencies or channels, tuning one at a time, typically in response to programmed instructions. These receivers typically include a memory in which frequency information for tuning the receiver is stored. The receivers are usually programmable for altering or establishing the stored frequency information and monitoring process. The programming feature permits the stored frequency information to be changed, for example, in response to location changes or changes in frequency allocation information. However, when a frequency agile radio receiver is in operation in an area where there are many transient transmitters, for example, mobile transceivers, the user of the frequency agile radio receiver may not know the frequencies of transmission of the nearby transmitters. The typical receiver is incapable of determining the frequencies of these transmissions so the receiver cannot tune to monitor them. Since listeners desire to monitor these nearby transmissions, it is desirable to include, within the radio, apparatus for determining the channel including the frequency of these nearby transmissions and, preferably, to provide for manual or automatic tuning of the radio receiver to that channel for monitoring them.

Some prior art frequency counters for tuning radio receivers have been available in housings separate from the receivers and connected to the receivers by cables, making use awkward. Counting of the frequency and tuning of the associated receiver are disadvantageously slow because the special purpose counters require at least two complete frequency determinations before producing an output.

Some prior art radio receivers have included frequency counters within the same housing, but are incapable of concurrent scanning and counting operations. Some prior art radio receivers have allowed external devices, while the radio receiver is scanning, to write into the memory the frequency being read for scanning. An appropriately interfaced frequency counter, among many other conceivable sources, could be configured as such an external device for writing into this memory. However, these receivers have front-end electronics (including bandpass filters and pre-amplifiers) that are dedicated to the sole use of the receiver unit. In any configuration of such extant radio receiver and frequency counter devices, the frequency counter device would be required to provide a separate and independent front-end electrical system, including bandpass filters and pre-amplifiers.

Accordingly, there is a need for a frequency determining and radio tuning and receiving apparatus that can rapidly and accurately determine the frequency of a received radio frequency signal, that can store information identifying this frequency into a memory, that can access this memory to tune the radio receiver through a sequence of frequencies carrying communications of potential interest to the user, and that continue updating the memory with information identifying further determined frequencies while the radio receiver steps through frequencies identified by data stored in the memory.

SUMMARY OF THE INVENTION

The present invention may be used by a radio scanner, a type of frequency agile radio receiver, for automatically monitoring communications channels that are, or have been, actively used by proximate transceiver or transmitter units. Dominant radio signals, presumably broadcast from nearby sources, are detected with a frequency determination apparatus, and a communication frequency is determined. The frequency determination process includes concurrent determinations of frequency and frequency stability to reject noise efficiently, and to select optimized sampling times for measuring marginal signals. This frequency may be tuned and monitored to receive communications immediately, and/or inserted into an active scan list stored in memory to receive subsequent communications.

The communications frequency determined may be the actual dominant frequency, or may be a related repeater output frequency, if the observed transmission is on a repeater input frequency. Meanwhile, the scanner cycles through all frequencies identified in scan memory, including frequencies that may be automatically entered by this application of the frequency determination apparatus. The scanner operation and frequency determination operate in a parallel mode, or in a coordinated and rapidly alternating serial mode, under common direction of a shared control system. The radio receiver and the frequency determination apparatus are jointly housed and share a substantial number of electronic elements, including a bandpass filter, which may optionally comprise a series of mutually exclusive elements with separate pass bands, and which may optionally feed a shared preamplifier circuit.

Accordingly, several objects and advantages of the present invention are:

to measure, rapidly and accurately, the frequency of signals in the electromagnetic environment;

to select, automatically, sampling periods for frequency determination that coincide with periods when a weak, fading, or transient signal is dominant in the electromagnetic environment and a valid frequency measurement may be obtained;

to report frequency measurements of the electromagnetic environment only when there is a dominant signal in the electromagnetic environment that may be measured;

to optimize the speed of a frequency counter that rejects noise or inaccurate results;

to determine the validity or invalidity of a frequency count before that frequency count is even complete;

to verify the presence of a measurable dominant signal without recourse to signal observations conducted before or after a sampling period for obtaining a frequency count;

to reject measurements of noise or unstable frequencies in the operation of a frequency counter;

to generate, update, maintain, and monitor a list of communications frequencies of interest, automatically, with a scanning radio receiver;

to receive two-way communications on a plurality of radio frequencies after one party to a communication on each of these frequencies transmits from a nearby location at least once;

to monitor communications involving nearby units without prior knowledge of their broadcast frequencies, while rejecting communications from certain transmitters that are not of interest to the user;

to monitor communications involving nearby units without prior knowledge of the broadcast frequencies of the units, while scanning a plurality of known frequencies of interest to the user, and receiving communications involving distant units on these known scanned frequencies;

to receive two-way communications over repeaters after a mobile transceiver unit broadcasts on a mobile repeater input frequency from a nearby location at least once, without prior knowledge that this repeater frequency is used by proximate transceivers;

to optimize the sensitivity of a frequency determination apparatus to determine the frequency of fading signals only briefly sufficiently coherent to be dominant in the local radio environment;

to continue receiving transmissions from proximate transmission sources as the transmission sources recede and the received signal weakens, and perform such reception for signals on a plurality of intermittent communications channels;

to reduce manufacturing costs through integration of a frequency agile radio receiver and a frequency determination apparatus, most particularly sharing a common bandpass filter apparatus and control apparatus; and to utilize limited time efficiently when each element of a bandpass filter is active in a scanning radio receiver for the operation of a frequency determination apparatus for the determination of frequencies within the pass band of the element of the bandpass filter.

According to one aspect of the invention, a method of determining stability of frequency and frequency of a frequency-stable electrical signal includes counting amplitude transitions of an electrical signal during a primary sampling period; counting the amplitude transitions of the electrical signal during each of at least two secondary sampling periods, wherein the secondary sampling periods are shorter than the primary sampling period and at least one of the secondary sampling periods partially overlaps, in time, the primary sampling period; comparing counts of the amplitude transitions of two of the secondary sampling periods to each other to produce a difference; comparing the difference to a threshold and determining that the frequency of the electrical signal is unstable if the difference exceeds the threshold; and, if the difference does not exceed the threshold, determining the frequency of the electrical signal from an accumulated count of the amplitude transitions accumulated during the primary sampling period.

In a second aspect, the invention provides a method of determining stability of frequency and frequency of a frequency-stable signal received from the ambient electromagnetic environment and includes receiving a dominant signal from ambient electromagnetic signals: counting amplitude transitions of an electrical signal during a primary sampling period; counting the amplitude transitions of the dominant signal during each of at least two secondary sampling periods, wherein the secondary sampling periods are shorter than the primary sampling period and at least one of the secondary sampling periods partially overlaps, in time, the primary sampling period; comparing counts of the amplitude transitions of two of the secondary sampling periods to each other to produce a difference; comparing the difference to a threshold and determining that the frequency of the dominant signal is unstable if the difference exceeds the threshold; and, if the difference does not exceed the threshold, determining the frequency of the dominant signal from an accumulated count of the amplitude transitions accumulated during the primary sampling period.

In another aspect, the invention provides a method of monitoring signals on established radio frequencies and detecting radio frequency signals on frequencies not being monitored, including tuning a radio receiver to one of a plurality of established frequencies stored in a data base, to monitor any signals on the established frequency to which the radio receiver is tuned; in conjunction with monitoring any signals on the established frequency to which the radio receiver is tuned, detecting a dominant radio frequency signal, and determining the frequency of the dominant radio frequency signal detected; and storing the frequency determined in the data base as an established frequency.

In still another aspect, the invention provides a method of monitoring signals on established radio frequencies and detecting radio frequency signals on frequencies not being monitored, including tuning a radio receiver to one of a plurality of established frequencies stored in a data base, to monitor any signals on the established frequency to which the radio receiver is tuned; in conjunction with monitoring any signals on the established frequency to which the radio receiver is tuned, detecting a dominant radio frequency signal, and determining the frequency of the dominant radio frequency signal detected; and tuning the radio receiver to the frequency determined and monitoring any signals on the frequency determined.

In a further aspect, a method according to the invention determines frequencies in the ambient electromagnetic environment that have active signals and that are received through an antenna by receiving a dominant radio frequency signal through the antenna; counting amplitude transitions of the dominant radio signal during a primary sampling period and calculating the frequency of the dominant radio frequency signal from the amplitude transitions counted during the primary sampling period, as an active non-established radio frequency; tuning a radio receiver to at least one established frequency that is stored in a database of established frequencies and testing for a signal on the established frequency to which the radio receiver is tuned, to identify an active established radio frequency; and repeating the receiving, the counting, and the tuning to identify a plurality of active non-established radio frequencies and active established radio frequencies.

In yet another aspect, an apparatus according to the invention provides for monitoring signals on established radio frequencies and detecting dominant radio frequency signals on non-established frequencies and includes a frequency agile radio receiver; a memory storing a plurality of established frequencies which are to be monitored by the radio receiver; a detector for detecting a dominant radio frequency signal in conjunction with monitoring of signals on an established frequency by the radio receiver; frequency determining means for determining the frequency of the dominant radio frequency signal detected by the detector; and a controller for controlling the radio receiver, operation of the detector and the frequency determining means, and storing in the memory of frequencies determined by the frequency determining means.

Further objects and advantages will become apparent from the drawings and the following detailed description.

DETAILED DESCRIPTION

Radio Receiver With Frequency Determination

Figure 1:
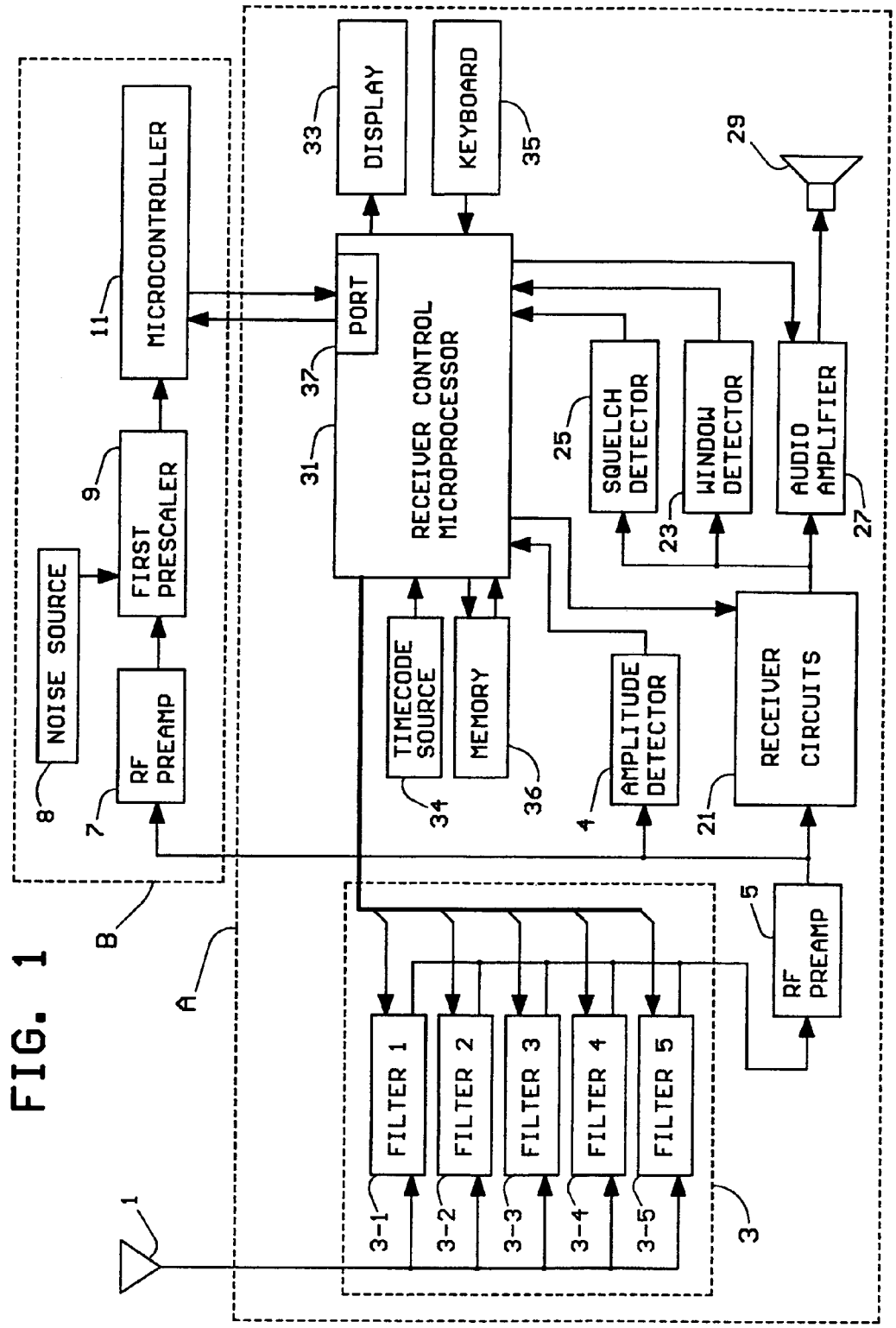
FIG. 1 is a block diagram of a radio receiver apparatus according to an embodiment of the invention.
Figure 2:
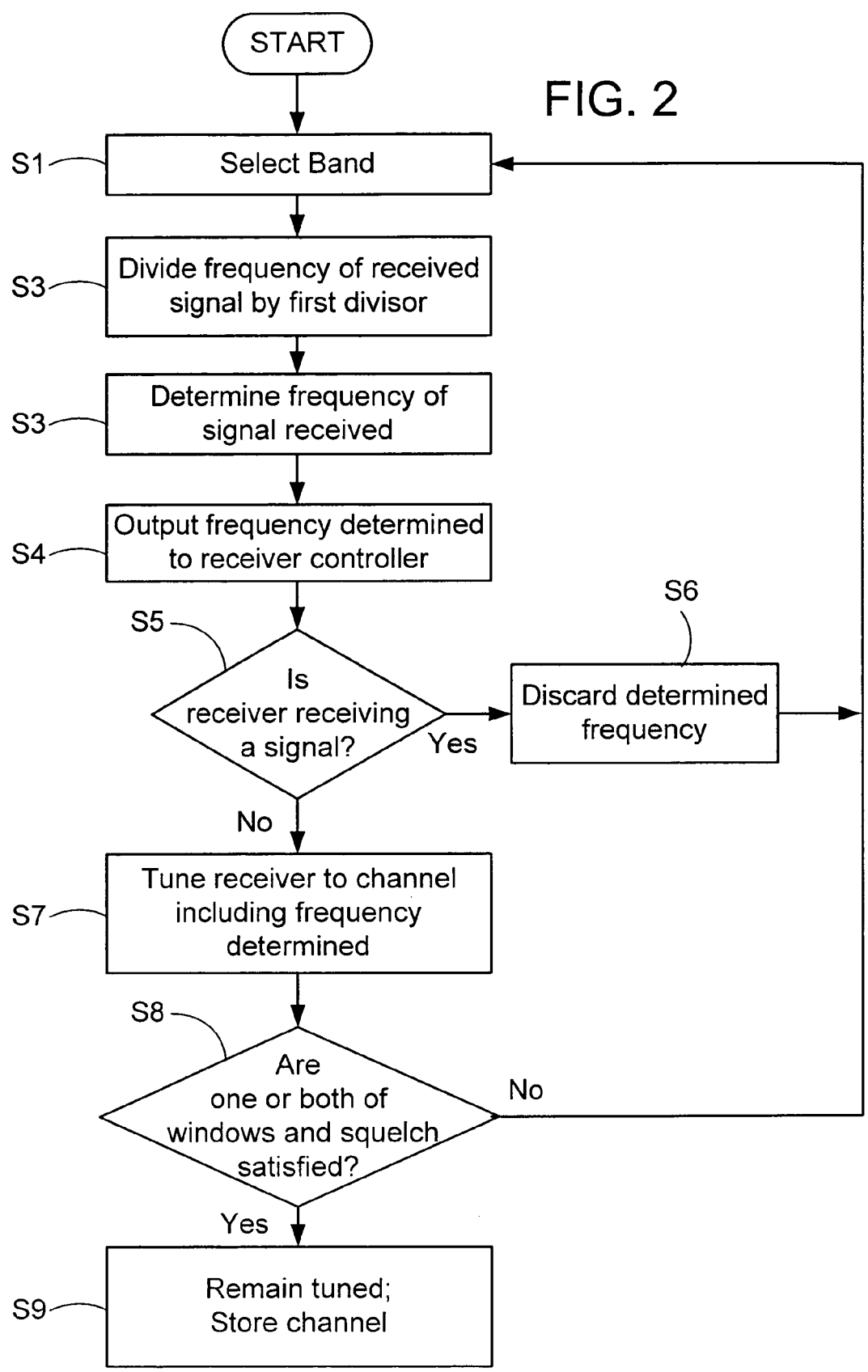
FIG. 2 is a flow chart illustrating a process for operation of the apparatus of FIG. 1.
Figure 3:
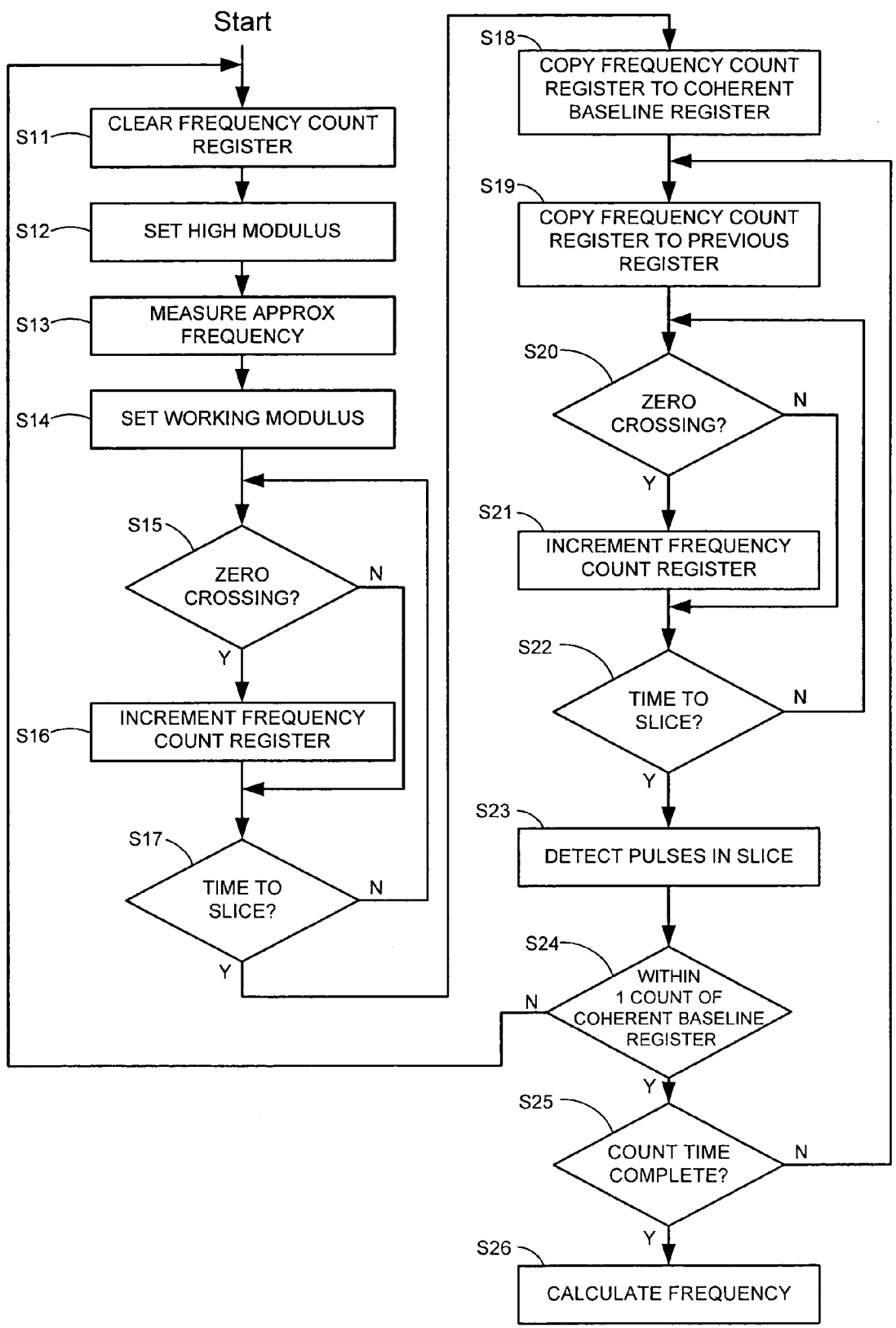
FIG. 3 is a flow chart illustrating a frequency determining method according to an embodiment of the invention.

FIG. 1 is a block diagram of a frequency agile radio apparatus including an apparatus for determining the frequency of a radio frequency signal according to an embodiment of the invention. FIG. 2 is a flow chart illustrating a method of operation of a radio receiver apparatus like that of FIG. 1 according to an embodiment of the invention. FIG. 3 is a flow chart illustrating a frequency determination method and its application to the apparatus exemplified by FIG. 1.

In the following description, emphasis is placed upon use of the invention in connection with a frequency agile receiver that receives radio frequency signals. However, the invention has several aspects and is not limited to application in radio receivers. For example, the frequency determination aspect of the invention may be generally applied to any frequency determination of a radio frequency signal, for example, through a directly connected circuit, without the reception of electromagnetic waves propagated from a transmitting antenna.

In the embodiment of FIG. 1, a radio receiver A that is frequency agile, i.e., can be tuned to various frequencies by an internal microprocessor, is interconnected with a frequency determining apparatus B. The receiver A includes an antenna 1 connected to a bandpass filter 3. The bandpass filter 3 desirably eliminates unwanted electromagnetic energy, including noise, outside a frequency range of interest. Further, although shown as a discrete element in FIG. 1, the bandpass filter 3 may be a part of a radio frequency amplifier or amplifiers used in conjunction with the filter element rather than a distinct circuit. In the illustrated embodiment, the bandpass filter 3 includes multiple filter elements. The illustrated embodiment includes five such filter elements. Each individual bandpass filter element has a particular pass band, different in frequency range from the pass bands of the other filter elements. In the illustrated embodiment, bandpass filter elements 3-1, 3-2, 3-3, 3-4, and 3-5 are illustrated. As discussed below, only one of these filter elements is connected at any particular time for providing to the signal processing circuitry of the receiver A whatever radio frequency signals are received at the antenna 1 and that fall within the pass band of the filter element that is connected at that time.

In a frequency determination mode, each of the bandpass filter elements is connected, in sequence, for a time sufficient for determining the frequency of a received signal falling within the pass band of the connected filter element. As a non-limiting example, when the invention is applied to a radio receiver intended to monitor communications between transceivers, one or both of which may be mobile or fixed, the filter element 3-1 may have a bandpass frequency range of 30–54 MHz. The frequency ranges of the other filter elements may be, for example, 108–136 MHz, 136–174 MHz, 406–512 MHz, and 806–956 MHz. These frequency ranges, as an example, include established communication frequency bands and avoid commercial broadcast frequencies. By describing a bandpass filter with five filter elements, it is not intended to require a multiple element filter in all or any application of the invention. A single bandpass filter may be appropriate for particular applications of the invention, for example, in simple frequency determinations.

Frequency Determining Apparatus

The output signal from the bandpass filter 3 is, preferably, amplified in a radio frequency preamplifier 5 to improve the sensitivity of the apparatus to relatively weak radio frequency input signals. The amplified radio frequency signal provided by the preamplifier 5 is supplied to the signal processing circuitry of the radio receiver A and to the frequency determining apparatus B. The frequency determining apparatus B includes an optional radio frequency preamplifier 7. This preamplifier 7 is optional in the illustrated receiver because the preamplifier 5 of the radio receiver may provide sufficient gain for both the receiver A and the frequency determining apparatus B. In fact, a single preamplifier may serve both of the frequency determining apparatus and the frequency agile radio receiver. This joint usage of a single element is an example of one aspect of the invention in which a commonly housed frequency counter and radio receiver share many common circuits, providing substantial economies. When the frequency determining apparatus B stands alone and is not part of nor connected to a radio receiver, or operates with pre-amplification independent of the signal path to receiver A, inclusion of the preamplifier 7 is highly desirable to increase sensitivity and improve overall performance.

The further amplified radio frequency signal from the preamplifier 7 is supplied to an optional first prescaler 9. When the highest frequency signal for which the frequency is to be determined is very high, it is useful to divide the frequency of the signal, i.e., to lower the frequency of the signal to be processed, before attempting to determine the frequency of the signal. Otherwise, the processing circuitry for determining the frequency can become quite complicated and expensive, particularly in processing frequencies, for example, that approach 1 GHz. The first prescaler 9 is a commercially available integrated circuit, for example, the SA701 available from Phillips Semiconductors, Sunnyvale, Calif. Preferably, the first prescaler 9 has a constant divisor by which it divides the frequency of the signal supplied to its input, regardless of the frequency, in order to produce a reduced frequency signal at its output.

It is preferred, in the invention, that the frequency of the signal output by the first prescaler 9 not exceed about 10 MHz for ease of processing the output signal from the first prescaler 9 without unusual circuitry. For example, the divisor of the first prescaler 9 may be set to 128, with regard to the specific, non-limiting example of the frequency ranges of the bandpass filter 3 previously described, to ensure that the output frequency of the prescaler does not exceed 10 MHz. In another, less preferred, embodiment, if the divisor of the first prescaler 9 is variable, for the example for the frequency ranges provided by the filter elements 3-1–3-5 described above, the divisor of the first prescaler 9 might be set at 8 for the frequency range of the filter element 3-1, 16 for the filter element 3-2, 32 for the filter element 3-3, 64 for the filter element 3-4, and 128 for the filter element 3-5. A connection to the first prescaler 9 from the radio receiver A is shown in FIG. 1. This connection is only present if the divisor of the first prescaler is variable and controlled in coordination with the selection of one of the bandpass filter elements 3-1–3-5 by the radio receiver.

As shown in FIG. 1, the first prescaler 9 supplies an output signal to a microcontroller 11 of the frequency determining apparatus B. Since the preamplifier 7 and the prescaler 9 are both optional, the frequency determining apparatus B may, in some embodiments, consist only of the microcontroller 11. The microcontroller 11 may be, for example, a PIC 12C672 microprocessor commercially available from Microchip Technology of Chandler, Ariz. The microcontroller 11 receives the radio frequency signal, adjusted by the preamplifier 7 and the first prescaler 9, if present. The microcontroller 11 provides an output signal, in the embodiment of FIG. 1, to the radio receiver A.

The manufacturer's specification for microcontrollers will generally specify the maximum rate at which a counter module can count. To ensure that counts are processed correctly, it is important to select a total effective prescaler ratio that divides an actual signal frequency to produce an apparent frequency within manufacturer specifications. This request encourages the selection of a larger effective prescaler ratio. However, the minimum required sampling period to obtain a frequency measurement at a required resolution is directly proportional to the total effective prescaler ratio. This consideration encourages a smaller effective prescaler ratio. The desired frequency resolution is usually lower for signals at a higher frequency, so it is optimal for microcontroller 11 to include a prescaler with a dynamically configurable divisor.

Preferably, the microcontroller 11 includes a prescaling function dividing the frequency of the input signal to aid in processing of the signal and determine its frequency accurately and quickly. The specific microcontroller identified here includes such a feature, referred to here as a second prescaler, having a second divisor. The second prescaler may have a selectable divisor, for example, any binary number between 1 and 256. The second prescaler may also be unused, in which case the prescaler divisor is, effectively, 1. In preferred embodiments of the present invention, the second divisor of the prescaler within the microcontroller 11 is 1, 2, or 4, depending upon the frequency of the signal received. By selecting a larger prescaler divisor for signals at high frequency, the required counting rate of TMR0 can be kept within manufacturer specifications. By selecting a smaller prescaler divisor for signals at lower frequencies, where these manufacturer specifications do not pose a constraint, frequency resolution can be improved for signals at these lower frequencies.

While this internal prescaler, and the setting of the internal prescaler divisor, is part of a preferred embodiment, these elements are optional and may be omitted. A single fixed internal prescaler, or no internal prescaler at all, may used within the scope of the present invention.

In the invention, as readily understood by one of skill in the art, the amplitude of a signal having a frequency to be determined is unimportant. The first prescaler 9, if present, is preferably insensitive to the amplitude of the received signal and preserves only phase information so that frequency can be accurately determined. One cycle of the signal is determined to have occurred between each pair of successive same-direction, e.g., positive-to-negative sign, zero amplitude transitions. One zero amplitude transition occurs at each time the amplitude of the signal changes in sign, either from positive amplitude to negative amplitude or from negative amplitude to positive amplitude. Either of these same-direction zero amplitude transitions or the successive different direction zero amplitude transitions are observed and counted in order to determine the frequency of the incoming signal, i.e., the number of effective cycles counted in one second. Since the "count" resulting from the counting of only same-direction transitions and from counting all transitions differs by a factor of two, ignoring the potential quantization error discussed elsewhere, it is not important which count is used so long as a frequency calculation from a count properly considers the factor. The preferred microcontroller counts only same-direction transitions. Unless expressly specified otherwise here, "counting zero amplitude transitions" and similar terms encompass both alternatives of counting only same-direction amplitude transitions and counting all amplitude transitions.

A noise generation apparatus 8 may be configured to introduce noise or high frequency variation to a power or signal line within the frequency determination apparatus, such as the power supply input to the first prescaler 9. Such a noise generation apparatus 8 may also be omitted from an implementation of the present invention.

An amplitude measurement apparatus 4 may be included to determine the amplitude of a signal passed through the bandpass filter 3, by a measurement preferably taken after the preamplifier 5, or optionally taken between the bandpass filter 3 and the preamplifier 5. An example of such an amplitude measurement apparatus is a peak detector in which a capacitor is charged through a diode to the peak amplitude of the wave at the output of the bandpass filter 3, or the preamplifier 5, with an analog-to-digital converter measuring the accumulated charge on the capacitor. Such amplitude measurement apparatus 4, and other implementations, are well known to persons of ordinary skill in the art. The amplitude measurement apparatus 4 may also be omitted from implementations of the present invention.

Radio Receiver

Turning again to the radio receiver A, the radio receiver A in the portions now discussed may be entirely conventional, except for the interaction with the frequency determining apparatus B. For example, the radio signal processing and control circuits may be those of the Uniden Model BC245XLT, a frequency agile radio receiver tuned in receiving frequency in response to execution of programmed instructions by an internal microprocessor. The circuits in the radio receiver that are conventional are, therefore, only described with respect to their well known functions.

In the radio receiver A, the amplified radio frequency signal from the preamplifier 5 is supplied to conventional receiver circuits 21. The conventional receiver circuits 21 include, for example, a first detector, a local oscillator and associated tuner for producing an intermediate frequency (IF) signal, IF amplifier stages, and a second detector circuit. The output of these conventional receiver circuits 21 is a demodulated signal including any received audio and a DC component indicating the location of the received signal within the pass band of the receiver. The receiver pass band is different from the pass bands of the bandpass filter 3 and its filter elements 3-1–3-5 described above. The receiver pass band is typically relatively narrow, for example, 25 kHz in width.

The signal output by the conventional receiver circuits 21 is supplied to three circuits, namely, a window detector 23, a squelch detector 25, and an audio amplifier 27. The window detector 23 produces a signal proportional to the location of the received signal position within the pass band of the receiver based on the DC component of the output signal of the receiver circuits 21. The output signal of the window circuit is subjected to a threshold test in the conventional receiver. In the invention, a second threshold test, independent of the conventional receiver threshold test, is applied to determine whether the signal being received is near the center of the receiver pass band. The squelch detector 25 indicates whether a signal is being received by the receiver. The squelch detector 25 produces a two-state output signal, a first output that is used as a muting signal to prevent audio noise from being heard when no signal is being received. That noise disappears when a signal is actually being received by the receiver. In that event, the other state output signal is supplied by the squelch detector 25 as an un-muting signal that permits the audio in the signal being received to be reproduced and heard. The un-muting and muting signals are supplied to and control operation of the audio amplifier 27 so that audio is only heard when a signal is being received. When the squelch and window detectors indicate that a signal is being received and is within the receiver pass band, the audio is produced at an audio output device 29. FIG. 1 indicates output through a speaker as a generic audio output, but headphones and other sound reproducing apparatus can be employed as well.

The radio receiver A is controlled in its operation by a receiver control microprocessor 31. The microprocessor 31 receives the outputs of the window detector 23 and squelch detector 25, processes their outputs, and sends an un-muting signal, when appropriate, to the audio amplifier 27. The microprocessor 31 controls frequency tuning of the receiver by sending a tuning signal to the tuner within the conventional receiver circuits 21. In coordination with that tuning, the microprocessor controls the particular filter element 3-1–3-5 employed in a particular receiving state in coordination with the tuning of the receiver circuits 21. Further, a display 33 is connected to the microprocessor 31 to display information, for example, the channel to which the radio receiver A is tuned and information used, for example, in programming or controlling the apparatus generally. Likewise, a keyboard 35 through which instructions and information are supplied to the apparatus, for example, in programming and providing other instructions for operation of the radio receiver A, is connected to the microprocessor 31. The microprocessor 31 can read from, and write to, a memory 36, which is capable of storing information identifying a plurality of radio frequency values. Microprocessor 31 may also access a timecode generation apparatus 34, such as a standard timekeeping apparatus, conventional clock, or a binary data storage register that may be incremented, for generating a numeric value indicating the relative ordering of events. Timecode generation apparatus 34 may be an integral portion of microprocessor 34, or an external device. Finally, the microprocessor 31 includes a data port 37 receiving a signal from the microcontroller 11, indicating a frequency determined by the microcontroller and used in tuning the radio receiver A as described below. Likewise, the connection provides for sending of control signals from the microprocessor 31, for example, regarding a frequency to which the receiver is tuned, to the microcontroller 11. The conventional receiver circuits 21 include an oscillator generating a highly precise clock for synthesized tuning of the receiver A. A clock, in this context, refers to an apparatus generating a clocking line for microprocessor operations, comprising a regular and high frequency pulse sequence. That clock is preferably also used by the microcontroller 11 so that a second precision oscillator, a relatively expensive circuit, is unnecessary. The sharing of a common high precision clock circuit between the radio receiver A and the frequency determining apparatus B is another example of an economy achieved in an embodiment in which the receiver and frequency determining apparatus are commonly housed.

Radio Receiver Operation

Figure 5:
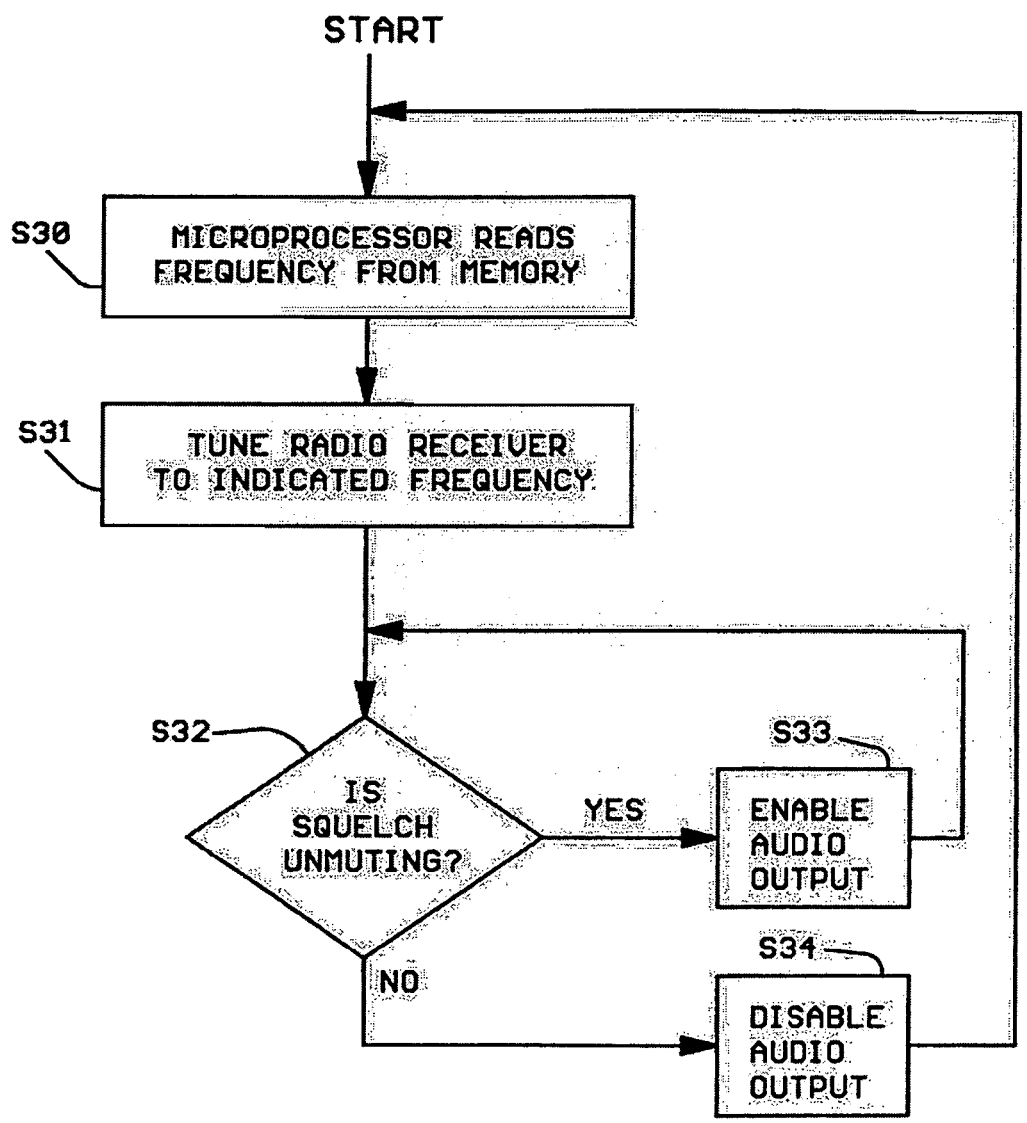
FIG. 5 is a flow chart illustrating the process scanning frequencies stored in a memory.

The operation of the radio receiver A and of frequency determining apparatus B are described in conjunction with the flow charts of FIGS. 2, 3, and 5.

Turning first to the flow chart of FIG. 5, in step S30, the receiver control microprocessor 31 reads frequency identification information from associated memory 36. Memory 36 may be an external component, such as a memory chip, or an integrated portion of microprocessor 31. Upon receipt of this frequency identification information, at step S31, the tuning of radio receiver A is adjusted to the indicated frequency. If bandpass filter 3 comprises a multiple element bandpass filter, one of the filter elements is selected, i.e., a normally open switch is closed, thereby connecting the selected filter element to the preamplifier 5. In this case, step S31 includes microprocessor 31 comparing the desired frequency to the known pass band of the currently active element of bandpass filter 3 at step S31, and, if the frequency is outside this pass band, commanding an element selection of bandpass filter 3 that is appropriate to this frequency. Once tuning has been accomplished, at step S32, a squelch test is applied to determine the presence or absence of a radio signal on the tuned frequency. If a signal is present, then audio circuits are enabled (or, if already enabled, left active) at step S33 allowing the user to monitor communications on this frequency. The process then reverts to step S32, further squelch tests are employed at step S32 until the absence of signal is detected. When the tuned frequency has no active signal, as determined at S32, either immediately after tuning or after an interval of unmuted audio reception, audio circuits are disabled (or, if already disabled, left inactive) at step S34, and the process reverts to step S30.

Turning to the flow chart of FIG. 2, in step S1, if there is a multiple element bandpass filter, one of the filter elements is selected, thereby connecting the selected filter element to the preamplifier 5. The amplified radio frequency signal is also supplied, for the specific embodiment depicted in FIG. 1, to the preamplifier 7, if present, and, thereafter, as indicated in step S2, to the first prescaler 9, if present. For the purposes of this example, it will be assumed that the first prescaler 9, if present, has a fixed value first divisor. That first divisor of the first prescaler 9 is applied to produce an output signal of reduced frequency as compared to the input signal in Step S2. In step S3, the frequency of the signal supplied to the microcontroller 11 is determined. That process in the microcontroller 11 of the frequency determination apparatus is described below in connection with and as part of the description of FIG. 3.

In one embodiment of the specific application being described, the frequency determined in step S3 is employed to tune the radio receiver A to a channel that incorporates the frequency but may have a center frequency different from the frequency determined in step S3 by the microcontroller 11. The tuning of the radio receiver A is achieved by the receiver control microprocessor 31 in response to a signal indicating the determined frequency and supplied to the data port 37 of the receiver control microprocessor 31. Once that tuning has been accomplished, the microprocessor 31 responds to the outputs of one or both of the window and squelch detectors 23 and 25. One or both of these responses may be tested. Preferably, the failure of either test, indicating improper tuning, terminates the frequency determination cycle underway and the process returns to step S1.

The output signal of the squelch detector may be tested to determine if it is a muting signal or an un-muting signal. If the squelch circuit is quieted by an incoming signal and produces the un-muting signal, there is confirmation that a signal is present in the receiver pass band. If the output of the window detector indicates that a signal being received is near the center of the pass band of the receiver, then there is initial or further confirmation that the channel corresponding to the frequency of the received signal has been accurately determined. If any of whichever of these optional window detector and squelch detector tests is applied fails, then microprocessor 31 recognizes that no signal is being received and the radio receiver A may revert to its former tuning, or scanning of frequencies indicated by values in memory 36. Upon successful verification that a received signal has been accurately tuned, applying one, both, or neither of the window detector and the squelch detector tests, the channel of the received signal is stored in step S7 in memory 36 as frequency information for future reference in monitoring transmission of the channel, such as may be employed during scanning operations shown in FIG. 5.

The frequency determination process operates in the background while the radio receiver A operates under other control instructions from the microprocessor 31, for example, fixed in tuning to a channel where a transmission is present or scanning for transmissions on established channels of interest, such as is shown in FIG. 5. In a preferred embodiment, once a preliminary frequency determination has been made in step S3 and output to the receiver controller in step S4, the receiver is tested in test S5 to determine whether the receiver is currently receiving a signal. This test S5 is made by checking whether the squelch detector is producing a muting or un-muting signal. If an un-muting signal is being produced by the squelch detector, indicating that a signal is being received, the process moves to step S6 where the new frequency determination is discarded. Then the process returns to step S1.

If, in test S5, it is determined that the squelch detector is producing a muting signal so that no signal is currently being received, then the process moves to step S7 and the receiver is tuned to the channel including the newly determined frequency. Thereafter, the signal on that channel is subjected to one or both of the squelch detector and window detector tests in test S8. Most preferably, at least the squelch detector test is applied. Then, upon passage of whatever tests are applied at test S8, the receiver may remain retuned to monitor the channel including the newly determined frequency and the channel including the newly determined frequency is stored in memory 36 in the receiver in step S9. Alternatively, the receiver may resume scanning frequencies after storing the frequency newly determined. If any of the test or tests applied at test S8 are not passed, the process returns to step S1.

The memory within the receiver control microprocessor 31 may include a list of frequencies that are within or outside the pass band of the filter 3 but are not to be monitored. Transmissions of paging systems provide one example. Then, before any automatic retuning of the receiver to a channel including a frequency determined or storage of a corresponding channel, a comparison is made between the list of excluded frequencies and the determined frequency. If the frequency determined or its corresponding channel is in the exclusionary list, then the determined frequency is discarded and the receiver is not retuned for monitoring or further testing and verification of the frequency determined, and no new channel information is stored.

The radio receiver and frequency determining apparatus described are particularly useful in monitoring communications of nearby mobile transmitters. The nearby mobile transmitters produce relatively strong signals that may be of particular interest to listeners because the communications concern the area near the listener. With the invention, these relatively strong signals can be detected and their frequencies determined. In some communication systems, mobile transmitters do not transmit and receive directly from a base station but, rather, use higher power repeater stations as an intermediary. Thus, the low power mobile transceiver effectively covers a much larger geographical area of communication than its transmitter would otherwise provide. In many frequency bands, the rules of the Federal Communications Commission require a fixed offset relationship between the frequencies used by the mobile units and the repeater frequencies which retransmit transmissions from the mobile units. Optionally, the memory of the receiver control microprocessor 31 retains information on the frequency offsets of the frequency allocation rules. Then, upon detection of a mobile transmission, the microprocessor 31 can automatically determine the frequency at which the corresponding repeater channel transmits and tune the receiver to that frequency where continued reception of both sides of the communication, i.e., transmissions of both the remote and nearby party, is more likely. After retuning to the repeater channel, one or both of the window and squelch tests can be applied to ensure that the receiver is properly tuned to a repeater frequency. If any of the applied tests fails, then the offset calculation may be inappropriate for the received signal so that the receiver does not remain tuned to the calculated frequency. Optionally, the receiver may be retuned to the channel corresponding to the frequency originally determined.

In the apparatus illustrated in FIG. 1, the switched bandpass filters are commonly used by the frequency determining apparatus and the radio receiver. As already described, although two radio frequency preamplifiers are illustrated in FIG. 1, a single preamplifier may be used for both functions and the microprocessor 31, and the microcontroller 11 can use a single high precision oscillator for certain operations. In fact, although not illustrated, a single microprocessor may be used in place of the microprocessor 31, and microcontroller 11, performing both the receiver control and frequency determination functions. These and still other common circuits may be shared in combining the receiver and the frequency determining apparatus into an economical single package unit.

The invention provides an apparatus that is simple, lightweight, and inexpensive, and is particularly useful for monitoring communications from nearby transmitters operating on previously unknown frequencies. In the preferred embodiment, the frequency determining apparatus is packaged within the same housing as the frequency agile radio receiver using that circuitry of the receiver that is common to the frequency determining apparatus as part of the circuitry of the frequency determining apparatus.

Frequency Determination Verification—Tuning Methods

The integration of a frequency determination apparatus with a frequency agile radio receiver offers some additional verification techniques. While the present embodiment seeks to eliminate false frequency determination reports by verifying stability in the observed signal during the frequency determination process, it may be beneficial to implement additional verification steps to further reduce the incidence of "false positive" frequency reports.

For example, the radio receiver can be tuned to the indicated frequency, and a squelch and/or window test applied to determine whether there is a true radio signal at the determined frequency. The application of verification steps involving a radio receiver offers a greater reliability with respect to false positive detections, an important advantage when detections lead to the consumption of a limited resource, such as storage locations in a memory.

In a practical design, there should be a consideration of trade-offs between the verification techniques. Verification steps requiring the involvement of a radio receiver may interfere with the radio's ordinary operation. For example, executing a squelch test on a frequency determined requires that the radio tune to the frequency determined, which may be undesirable if the radio is presently receiving audio communications on another frequency. On the other hand, a dominant signal may be considered of high priority, and, therefore, it may be desirable to pre-empt ongoing reception if there is a high probability that a valid dominant signal is available for reception on another frequency.

In general, this issue makes tuner-independent verification desirable, such as through detection of coherence in zero amplitude transitions or low variance in observed radio frequency. This verification technique does not eliminate the desirability of tuner-dependent verification steps, such as squelch and/or window tests, since these tests further improve the reliability of the system. However, if the radio is otherwise occupied with receiving transmission, it may be desirable to consider a frequency determination valid without the application of tuner-dependent verification steps that would otherwise be performed, and to utilize the frequency determined such as storage in memory, to enable subsequent scanning reception on the frequency determined.

In configurations where there is no tuner-independent verification, or if a tuner-independent verification is considered of insufficient reliability for frequency determination, is recommended to tune the radio receiver to the determined frequency for verification prior to use in applications such as storage. If the radio receiver is in a scan mode, such tests may be performed frequently. However, a high rate of frequency determination will diminish scan performance because every reading within a frequency band of interest must be checked by a tuned radio. Thus, it may be desirable to execute frequency determinations at a low rate, so that a higher fraction of tuning events can be used for scanning purposes. The situation is more problematic if the radio is monitoring a transmission, since the tuning step to verify each reading within a frequency band of interest must interrupt the reception of the transmission on the originally tuned frequency. The tuning to the frequency determined should be very brief, so that the audio reception is kept as close to normal as practical.

If the radio may be tuned in response to a frequency determined, it may be desirable to disregard detections of this frequency while the radio is already tuned to that frequency. A dominant signal may be expected to produce a steady stream of frequency determinations throughout the duration of the dominant signal transmission. If the radio attempts to respond to each determination as if it were a new event, the radio may repeatedly execute an unnecessary tuning process that disrupts and degrades reception. To achieve only limited tuning and frequency determination events, the radio may compare the frequency determined to the tuned frequency, and disregard the determination if the difference is sufficiently small. Especially with the large number of determinations expected in this case, inaccuracy in determination may produce some determinations that differ in small quantity from the actual tuned frequency, so the tolerance band should be sufficiently large to reject such determinations as well.

Noise will generally lead to a determined frequency within the pass band of the currently active element of the bandpass filter, since noise is preferentially passed in that band. The frequency determined will be essentially random within this pass band, although the electrical characteristics of the device may bias false detections towards certain smaller regions of the band. If the range or combined ranges of frequencies of interest to the user, called target bands, are substantially smaller than the pass band of the selected element of bandpass filter, it is probable that noise will generate false detections outside these target bands. Therefore, if the system has information defining target bands, the system can reject a high proportion of false detections regardless of what verification steps are applied for the discrimination of valid from invalid frequency determinations. This rejection may be useful for a less sophisticated frequency determination apparatus, and for reducing the demand for tuner response to apply tests, such as the squelch and/or window tests. The rejection is especially useful for addressing the problem of false detections triggering tuner responses when the radio receiver is otherwise occupied with the reception of a transmission on another frequency.

Target bands may be disjoint and composed of a plurality of separated continuous regions, or may be a single continuous region. A specific target band may be bounded on one or two ends, and a bounded target band may be of any width, including either a plurality of channels or a single channel or coincident with one or more pass bands or frequency bands. Similar advantages may be obtained for similar reasons by the use of exclusion bands, which are single ranges or combined ranges of frequencies not of interest to the user. In effect, target bands and exclusion bands are mirror images of each other, because a partition of a region of radio spectrum into regions of interest and regions not of interest creates partitions corresponding to target bands and exclusion bands. In addition to their utility for reducing the rate of false determinations due to self-oscillation, exclusion bands may also be useful for excluding valid frequency determinations from sources that are not of interest, such as paging or data transmitters. Exclusion bands may also be useful for increasing speed and efficiency, by inhibiting the frequency determination process from selecting filters for pass bands that do not contain frequencies of interest, or inhibiting the frequency determination process when such band pass filters are selected.

Figure 6:
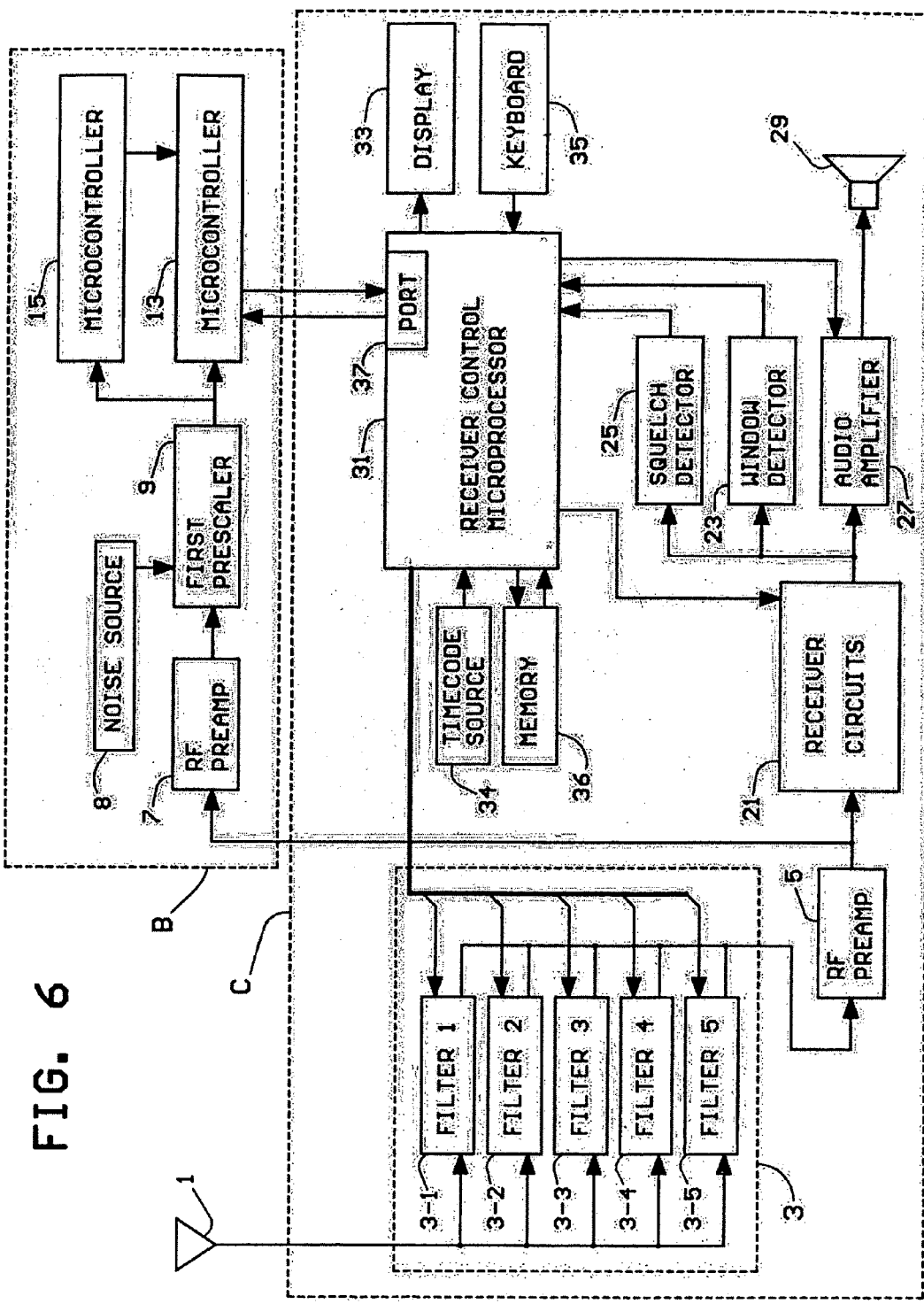
FIG. 6 is a block diagram of a radio receiver apparatus according to an embodiment of the invention.

A frequency determination apparatus observing noise may typically self-oscillate, or bias false detections towards particular frequencies. It may be desirable to disrupt or destabilize this self-oscillation to cause the zero-crossing transitions to become more erratic, so that tuner-independent verification techniques, such as coherence testing or comparing multiple independent frequency determinations, will be more effective. This technique reduces the rate of false detections, and the demand for radio receiver tunings to verify or respond to false detections, improving overall performance. An effective way to disrupt self-oscillation is the introduction of small amounts of noise or similar variation into a power line within the frequency determination apparatus, such as the power supply for the first prescaler. In an alternative implementation, this noise or similar variation is introduced into a signal line, such as the signal input for the first prescaler, which carries the signal passed from the output of the bandpass filter. In any case, the noise or similar variation may be from a noise generator, high frequency clock, audio circuit, or other source of irregular or high frequency signal. Any of these signal sources are effective as the noise generation apparatus 8 of FIGS. 1, 3, and 6.

Additional Frequency Determination Methods and Apparatus

There are many embodiments of the frequency determination methods and apparatus within the scope of the present invention in addition to those already described. The methods presented here may be practiced with relatively simple components, e.g., microcontrollers with a single 8-bit counter module and employing no free-running timers. Specific details of particular embodiments may obviously be varied, especially when implemented on more complex devices with a wider range of timer and counter support elements, or when the process is integrated with other parallel functions. Alternatives will be evident to a person of ordinary skill in the art. A number of specific embodiments are described in the following sections concerning frequency determinations.

Frequency Determination—Slices, Coherence, and Noise Rejection

Another exemplary method of frequency determination is now described, in accordance with FIG. 3, using primary sampling periods, and determining a frequency during a primary sampling period. As described for another embodiment, by counting zero-crossing transitions during secondary sampling periods, frequency stability can be determined. The use of secondary sampling periods is not essential to determining frequency. The primary sampling period may be the only sampling period used to determine the frequency of a signal.

The counting of zero amplitude transitions begins at step S15 where the counted amplitude transitions increment a count maintained in the frequency count register that was set to zero in step S11. In the specific microcontroller identified above as usable in the frequency determining apparatus, a free-running counter TMR0 is incremented in response to each cycle at the output of the prescaler 9. This free-running counter is the lowest byte of the frequency count register. The running count of amplitude transitions is accumulated in step S17 of an initial part of the frequency determination process.

The microcontroller 11 includes a free-running counter module that automatically increments a special register in the respective microcontroller in response to a transition on the output of first prescaler 9. In the exemplary microprocessor used, a PIC 12C672, such a free-running counter module (including the special register) is called TMR0. The special register of TMR0 is an 8-bit register, with an "overflow flag" that is set upon an overflow rollover from 255 to 0 and cleared only by a software command.

In the present embodiment, it is desirable to obtain counts of transitions at the output of first prescaler 9 that exceed the 8-bit capacity of the TMR0 register, e.g. accumulate counts with a magnitude exceeding 255. Persons of ordinary skill in the art will be familiar with several techniques for accumulating larger counts. For example, one or more registers holding higher significance bits may be advanced in software that monitors the "overflow flag" each time the flag is set; or the microcontroller can be configured to execute an interrupt service routine with similar actions automatically, upon setting of the "overflow flag"; or a larger number of bits or registers may be configured to cascade and naturally accommodate larger values.

In one application of the invention, as already described here, a frequency determining apparatus B is used to tune the frequency of a frequency agile radio receiver. The tuning is made to particular channels rather than to specific frequencies. The channel spacing, i.e., frequency allocation, depends upon the transmitting frequency. For example, at higher frequencies, such as 900 MHz, channel spacing may be 12.5 kHz. At lower frequencies, the channel spacing may be only 5 kHz. Therefore, in order to determine accurately the highest frequency of the frequencies of usual interest, a precision of about 1 part in 72,000 (i.e., $900 \times 10^6 \div 12.5 \times 10^3$) is required. In digital signal terms, at least 72,000 transitions must be counted in order to determine the highest frequency of usual interest with the precision necessary for this application of the invention.

In typical digital signal processing, 8 bit registers, for which the maximum count is 255, are employed. Therefore, the basic 8 bit register, e.g., the lowest byte free-running counter TMR0 referred to above, in the microcontroller 11 that responds to each transition from the prescaler 9, if present, or to the radio frequency signal directly if the prescaler 9 is omitted, is insufficient in maximum counting capacity for the receiver application described here. To provide the necessary count capacity for a precision of one part in 72,000, several 8 bit registers may be used in combination. The use of multiple registers can be accomplished in various ways known to those of skill in the art. For example, registers may be conceptually assembled end-to-end, through programming, so that each overflow bit from a first register is counted in a second 8 bit register, and overflow bits from the second register are counted in a third register. Alternatively, a register may be monitored at regular intervals to determine when each overflow occurs and another register incremented for each such detected overflow.

A feature of the frequency determination aspect of the invention is the concept of coherency and the determination of the frequency only of "coherent" signals. Incoherent signals are discarded in the course of the frequency determination according to the invention. This feature of the invention is particularly important in applications of the invention to radio receivers so that signals on different frequencies are not confused. Likewise, by determining the frequency of only coherent signals, random noise is rejected in the invention. The coherency test is achieved in the invention by establishing a baseline count of zero amplitude transitions, i.e., zero-crossings, for an initial time period of a received signal, extracting a plurality of equal duration time periods from the remaining part of a sampling time, counting zero amplitude transitions in each of those equal duration time periods, successively, and, if there is disagreement between the baseline count and a count in a subsequent time period, determining that the signal is not coherent. Upon determination of lack of coherency during or after counting, the partial or complete results of the frequency determining cycle are discarded. In other words, either a frequency determination in progress is terminated or the result of a complete frequency determination is discarded. A specific example of such a process is now described with reference to FIG. 3.

More specifically, the zero amplitude transitions of the received signal are counted by incrementing the frequency count register in step S16 for a first time period of fixed duration. The first and subsequent time periods of equal duration are sometimes referred to here as time slices. Whether the end of this first time slice has been reached is tested in test S17 after each increment of the frequency count in step S16. An exemplary, but non-limiting, example of the duration of such a time slice is 8 milliseconds. When the test S17 is fulfilled, the value of the count of transitions for the first such time slice is established as the base line count for this sampling. Meanwhile, the counting of amplitude transitions continues, with the frequency count register count copied into a previous count register at step S19. The previous count register is used in further steps of the process.

In the second and subsequent time slices identical in duration to the first time slice, amplitude transitions are counted at test S20 as in test S15, with each count incrementing the frequency count register at step S21. The end of each time slice is detected in test S22. When the end of each subsequent time slice is identified at test S22, a determination is made in step S23 as to whether the received signal has remained coherent. If a received signal is coherent, then the slice count during each of the time slices of equal duration will be exactly the same subject only to an identifiable error. This error, typically referred to in the art as "quantization error", may occur because of the phase of the incoming signal at the beginning and the end of each time slice. The error cannot exceed plus or minus 1 count.

Numerous mathematically equivalent tests may be applied to determine coherency, i.e., whether counts for each time slice do not vary by more than the quantization error. In the preferred embodiment, illustrated in FIG. 3, in step S23, the count stored in the frequency count register, i.e., the total accumulated count at that time, has subtracted from it the count in the previous count register, a count established at step S19. The resulting difference is the count for the time slice just concluded. That difference is stored in a register referred to here as a coherence count register as step S23. In the test S24, the difference stored in the coherence count register is compared to the count in the baseline register, i.e., the count from the first time slice. If the count in the coherence count register differs from the count in the baseline register by more than 1 count, then the received signal is not coherent, the frequency determination in process is aborted, and the process returns to step S11, resetting the frequency count register to zero and starting the frequency determination process again For each subsequent time slice for which there is agreement, within the quantization error, of the count of the coherence count register and the coherence baseline register, the process moves from test S24 to test S25 as the frequency count register accumulates a total count. The accumulation continues until the end of a total count time, sometimes called a primary sampling period, without a failure at test S24. For example, in the non-limiting radio receiver embodiment previously mentioned, sixteen such time slices of 8 milliseconds duration each, making for a total count of 256 milliseconds, are used. The total count time is entirely arbitrary as is the duration of each "slice". It is convenient, but not required, that the total count time be an integer multiple of the duration of each "slice" period. In any event, when the total count time ends, the process passes from test S25 to step S26 where frequency is calculated from the total count accumulated in the frequency count register.

Alternatively, the comparison of the counts for each of the time slices, i.e., periods, to the count for the first time period may be delayed until after the end of the total count time. In that alternative embodiment, with reference to FIG. 3, test S24 is postponed until after test S25. Then test S24 is carried out, before the frequency calculation at step S26. Since, in this alternative, no comparison of time slice counts is made until the end of the total count time, there is no termination of the frequency determination process before the end of the total count time, as in the embodiment previously described.

Still more generally, since the objective of the comparison of counts for each time slice is to determine coherency, i.e., whether the counts vary by more than the quantization error, the count for any time slice can be used as the reference count. In other words, one arbitrarily chosen time slice count could be selected, particularly after all time slice counts have been obtained at the end of the total count time, and that selected time slice count compared to all other time slice counts. A time slice count for a time slice other than the first time slice may be selected at any time during passage of the total count time. Then, the selected reference time slice count is compared to the other time slice counts to determine whether there is agreement within the quantization error. With regard to FIG. 3, in this alternative, the step S18 is postponed and occurs at a particular time slice n, where n is an integer. In any event, for best efficiency in processing time and to minimize memory requirements, it is preferred to use the first time slice count as the reference count. Nevertheless, the described alternatives provide equivalent conceptual and practical results.

The accumulated count in the frequency count register is an indicator of and is proportional to the frequency of the signal received. In order to obtain the actual frequency of the signal processed, it is necessary to multiply the total count in the frequency count register by the first and second divisors of the first and second prescalers, if present and used, and to divide by the total count time. For example, in the exemplary embodiment described, the total count is multiplied by 512 when the first prescaler 9 divides the frequency by 128 and the second prescaler divides the frequency by 4, and is divided by 0.256 when the total count time is 256 ms. The frequency determined is an output signal of the microcontroller 11.

In general, frequencies accurately determined with frequency determining apparatus will be dominant frequencies in the radio environment. Technically, a dominant frequency is any signal with an amplitude of approximately 10 decibels or more above the noise floor, when the noise floor is defined as the combined amplitude of all other signals and random noise. In this case, the peak amplitude of the noise floor does not exceed the peak amplitude of the dominant signal for more than a very small percentage of the time. Thus, when a dominant frequency is present, the frequency can be accurately determined with an appropriate frequency determination apparatus.

Some frequency counter designs will report the actual determined frequency at the output of bandpass filter 3, irrespective of whether this frequency represents a dominant signal. In this case, it is important to reject non-dominant signals by verifying the presence of signal on the determined frequency in some secondary method, such as tuning a frequency agile radio receiver to said determined frequency and determining whether a squelch circuit generates an un-muting signal indicating the presence of a signal on that frequency, or tuning a frequency agile radio receiver to the determined frequency and determining whether a window test shows that the signal within the radio receiver's band pass is concentrated at the center of this band pass, or determining whether the overall amplitude of radio signals coincident with the determined frequency was substantially large, or elevated with respect to a previously observed noise floor. By integrating a frequency determination apparatus with a frequency agile radio receiver, it becomes possible to perform such sophisticated secondary tests to discriminate between determined frequencies corresponding to dominant signals and determined frequencies measuring, or significantly contaminated by, the noise floor.

Frequency Determination—Primary and Secondary Sampling Periods, Coherence and Stability The ordinary radio spectrum includes background noise from a variety of sources and numerous weak radio signals. This background noise appears at the output of bandpass filter 3. In the absence of a strong or dominant signal, this background noise will still cause some zero amplitude transitions. Therefore, a frequency determination apparatus could still observe an apparent frequency even in the absence of a valid dominant signal. Such an apparent frequency would be essentially a random observation of noise, and not of value in the present invention.

One of the major challenges in a frequency determination is discriminating valid from invalid frequency determinations, i.e., determinations corresponding to a dominant signal versus apparent frequency determinations corresponding to noise. Conventional approaches to resolving this problem depend on making a plurality of independent and sequential frequency measurements, collecting the measurements, and rejecting the collected measurements when the variance of the frequency measurements is substantial. This process is based on the fact frequency measurements from noise will be less consistent than frequency measurements of a dominant signal.

The next-described embodiment provides for the verification of frequency stability during the duration of a single frequency measurement primary sampling period, providing a faster and reliable frequency determination. Further, by allowing a primary sampling period to be completed only when frequency stability is verified, the next-described embodiment automatically aligns frequency measurement sampling periods with intervals of frequency stability in the signal being observed. This alignment provides accurate frequency determinations of weaker signals, and increased sensitivity and range, compared to prior art techniques for discriminating valid and invalid frequency determination results.

An important aspect of the present embodiment is that frequency and frequency stability are determined from separate concurrent counts of the output of the first prescaler during a single sampling period of sufficient duration to determine a frequency. In some frequency counters, a raw count of zero amplitude transitions is obtained over a sampling period. The frequency is then obtained by a mathematical formula incorporating the raw count, the sampling period, and the total effective divisor introduced by any prescalers between the counter and the raw signal. The resolution of such a frequency counter is determined by the marginal difference in frequency represented by one count. For practical utilization, there is typically a minimum required frequency resolution. To achieve this resolution with equipment utilizing a certain prescaler divisor, the minimum sampling time must equal or exceed the total effective prescaler divisor, a dimensionless number, divided by the required frequency resolution.

In the present embodiment, a raw count is accumulated during a primary sampling period, and this count may be converted to a determined frequency and reported. That process is well known and typical of conventional frequency counters. In a non-limiting example, it is assumed that the duration of the primary sampling period is selected to approximate the minimum sampling time required to determine a frequency to the required resolution. It is clearly possible to select a longer duration for the primary sampling period as an alternative within the scope of the present invention.

In the present embodiment, counting in a plurality of secondary sampling periods occurs within the time interval of the primary sampling period. The counts obtained for the secondary sampling periods are not used to determine frequency, but to determine frequency stability during the interval of the primary sampling period. These secondary counts can be used to verify coherence, i.e., the property that the pulse pattern at the output of the first prescaler is consistent with the hypothesis that there is a stable frequency at this point in the circuit. Thus, analysis of counts from the secondary sampling periods verify that the count obtained during the concurrent primary sampling period can be used to determine, accurately, the frequency of a real signal. In this manner, in the minimum time theoretically possible for making an unvalidated frequency determination using conventional frequency counter techniques, a result can also be verified as representing a valid frequency.

The process described below for accumulating and manipulating these counts is a preferred, but not exclusive, process since various alternatives may be used to achieve the same end. Further, other well-known frequency determination methods may be used as alternatives to the preferred embodiment described in this non-limiting example.

As illustrated in the apparatus of FIG. 1, using a method shown by the flow chart of FIG. 3, a primary sampling period is subdivided into a plurality of secondary sampling periods or "slices". A single counter is employed for performing both counts, making use of the feature that in this specific subdivision configuration the count over a primary sampling period is equal to the sum of counts over secondary sampling periods.

As illustrated in FIG. 3, a frequency determination process begins at step S11 with the clearing of a frequency count register. This register will be used to accumulate a count over a primary sampling period. The total count would also include the automatically updated free-running counter TMR0 as a low-order byte.

In order to establish the second divisor of the second prescaler within the microcontroller 11, in step S12, the internal prescaler is initially set to a large value to allow accurate counting of the highest frequencies that may be observed. The microcontroller briefly monitors the incoming signal with a second divisor of 4 and counts the zero-crossing transitions of the signal to obtain a prescaling count indicating, in step S13, an approximate frequency band of the input signal. The time period for monitoring the frequency of the signal received needs only to be sufficiently long to obtain a rough estimate of the frequency. An exemplary time period for determining the second divisor is 10 microseconds, during which time a sufficient number of zero-crossings, i.e., amplitude transitions, is observed to estimate the frequency with an accuracy of about 1 to 5 MHz and establish the second divisor set in step S14. The selected divisor is the lowest available prescaler setting that, in light of the frequency specifications of the counter module, allows accurate counting of zero amplitude transitions at the output of this second prescaler.

A timing loop measures the duration of a secondary sampling period, called a "slice", as the sum of slices corresponds to a primary sampling period. In this embodiment, the timing is governed by ensuring that the number of instruction cycles executed is predetermined and fixed over all possible program paths, so no free-running timer is required. The software executes a loop a fixed number of times, each loop having exactly the same time duration. This loop encloses steps to maintain the frequency count register. TMR0 is automatically advanced in response to zero amplitude transitions, and the TMR0 interrupt flag is tested by software at S15. The software-maintained frequency count register is incremented conditionally at step S16 in response to this flag. Then, the loop closes at step S17 with a test to determine if the correct number of loop iterations has been executed.

If the loop termination test at S17 indicates that the correct time has elapsed, at step S18 the accumulated count of the frequency count register plus TMR0 is copied to a "coherence baseline register". The copied value represents the total count over the first slice, e.g., first secondary sampling period.

At the start of each subsequent slice, i.e., all remaining secondary sampling periods, the initial count of the frequency count register plus TMR0 is copied to temporary storage in a previous register count at step S19. A timing loop, similar to the loop for the first slice, is implemented for subsequent slices, i.e., all remaining secondary sampling periods until the primary sampling period is complete, and executed. This process is represented by steps S20, S21, and S22, which are functionally equivalent to steps S15, S16, and S17, respectively. At the termination of each of these secondary sampling periods, the count accumulated during that secondary sampling period is calculated at step S23 by subtracting the previous register count from the updated value of the frequency count register plus TMR0. This "slice count" is then compared with the coherence baseline register in step S24 to implement a "coherence test".

When zero amplitude transitions are counted over fixed intervals, in response to a signal with constant frequency, the measured counts will always have one of two adjacent numerical values. This count variation is an artifact of the analog-to-digital conversion process, and does not reflect a variation in frequency. Thus, if a signal is counted in this fashion over a plurality of secondary sampling periods, and observed to produce one of two adjacent values reliably, the signal may be described as "coherent", or plausibly produced from a signal of stable frequency. In this implementation, a slightly looser test is executed for convenience and to determine whether the counts for all secondary sampling periods are within +1 or −1 of the count for the first secondary sampling period. This agreement technically would validate a signal that produces any of three adjacent values, and is functionally close enough to an ideal implementation for ordinary purposes.

If this test, performed at step S24, fails, the frequency has been determined to be unstable, and the partial frequency count that has been collected in the frequency count register is discarded. The process reverts to step S11 and a new frequency count is initiated. Alternatively, if the test passes, at step S25 a test is performed to determine whether the primary sampling period has been completed. In the absence of a free-running timer, and with careful attention to execution times, this test can be implemented by maintaining a count of loop iterations, since these counts have a precisely known duration. For example, a primary sampling period timer may be initialized to a starting value representing the desired interval prior to the start of a count, and decremented with each loop iteration. When this counter reaches zero, if the count process is still running, i.e., no "coherence test failure" has terminated the process, the count process may terminate successfully with signal stability validated.

If the primary sampling period is not complete, the process reverts to step S19 and a new secondary sampling period is initiated. Alternatively, if the primary sampling period is complete, the frequency may be calculated at S26 by multiplying the count of the frequency count register plus TMR0 by a scaling factor representing the total prescaler divisor, from both prescalers, if applicable, and the clock duration of the primary sampling period.

Frequency Determination—Two-Chip Embodiment—Separating Coherence and Frequency Determinations In a preferred embodiment already described, the microcontroller 11 performs counts over both primary and secondary sampling periods. However, these two counting functions may be performed separately, as illustrated by the embodiment depicted in FIG. 6.

In this embodiment, a second microcontroller 15 counts zero-crossings during a primary sampling period to make a frequency measurement. At the same time, a first microcontroller 13 counts during the secondary sampling periods, and applies a test for frequency stability. If this stability test fails, the first microprocessor 13 generates a reset signal which is sent to the second microcontroller 15, terminating any ongoing counting or frequency determination process, by the second microcontroller 15, discarding any interim results, and triggering the initiation of a new primary sampling period. The second microcontroller 15 counts during the primary sampling period, determines the frequency of an observed, i.e., received signal, and reports the frequency determined to another system, such as radio receiver A. When the reset signal from first the microcontroller 13 is issued, the second microcontroller 15 terminates any ongoing counting or frequency determination, discards any results, and restarts the frequency determination process.

Each of the first microcontroller 13 and the second microcontroller 15 includes a free-running counter module that automatically increments a counting register in the respective microcontrollers in response to a zero-crossing transition at the output of the first prescaler 9. In an exemplary microprocessor used for each of the first microcontroller 13 and the second microcontroller 15, a PIC 12C672, such a free-running counter module, including the counting register, is the TMR0 register previously described. The TMR0 is an 8-bit register, with an "overflow flag" that is set upon an overflow rollover from 255 to 0 and cleared only by a software command. As previously described here, to accumulate counts transitions at the output of the first prescaler 9 that exceed the 8-bit capacity of the TMR0 register, e.g., accumulate counts with a magnitude exceeding 255, known techniques are employed. For example, one or more registers holding higher significance bits may be advanced in software that monitor the "overflow flag" each time it becomes set; the microcontroller can be configured to execute an interrupt service routine with similar actions automatically upon setting of the "overflow flag"; or a larger number of bits or registers may be configured to cascade and naturally accommodate larger values.

Figure 7:
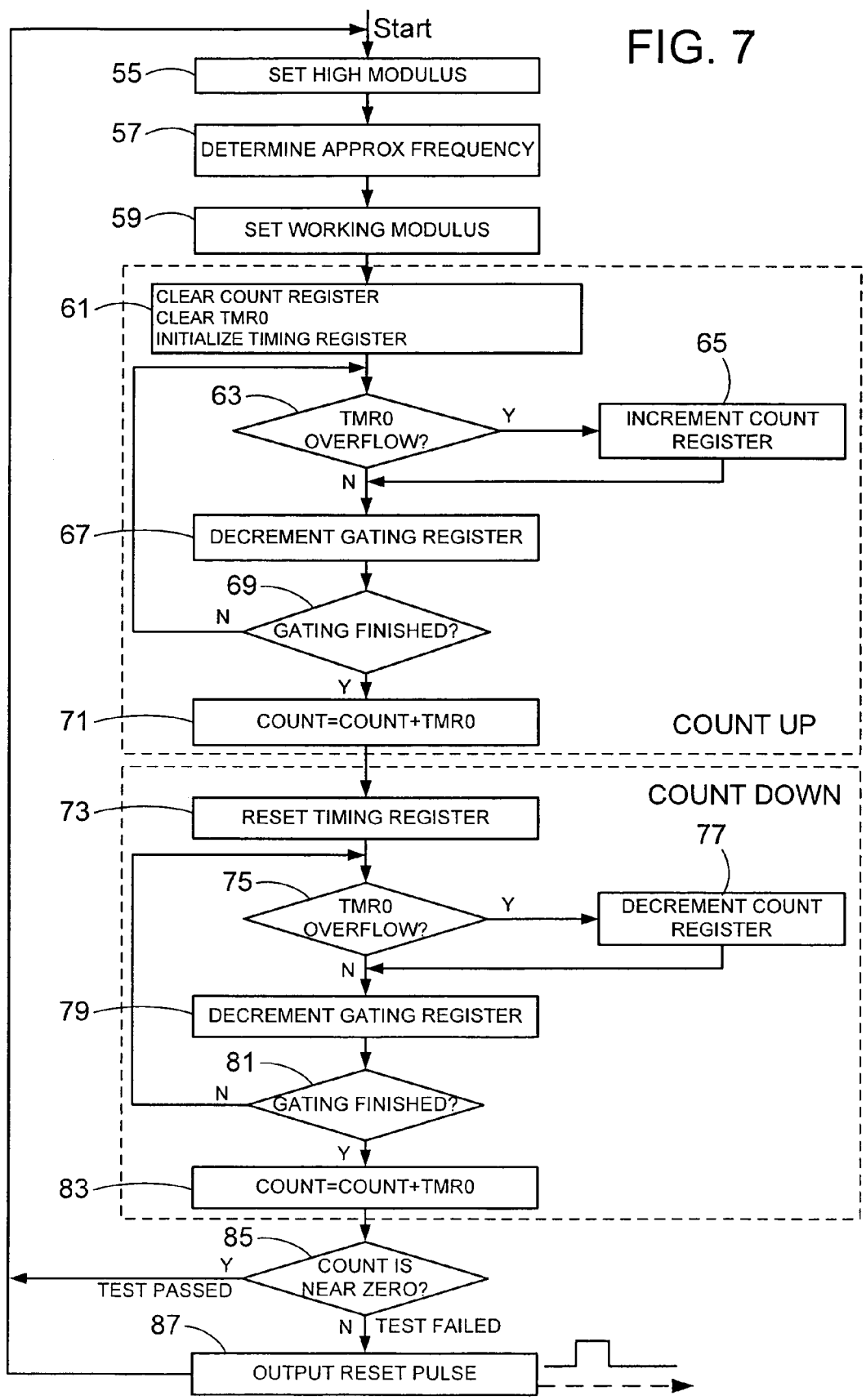
FIG. 7 is a flow chart illustrating a method of determining frequency stability of a dominant signal according to an embodiment of the invention.

A specific example is described below with reference to FIGS. 7 and 8. For clarity, the process for each of the first microcontroller 13, i.e., Frequency Stability Verification, and second the microcontroller 15, i.e., Frequency Counter, is described separately, and is illustrated separately in FIGS. 7 and 8, respectively. In a preferred embodiment of the present invention, these microcontrollers operate simultaneously to generate frequency measurements from observations of an electrical signal during even brief periods of frequency stability.

Two-Chip Embodiment—Frequency Stability Verification

In a preferred embodiment, all counts flow though the automatic counting process of the free-running counter module TMR0. The TMR0 count register is monitored with software and effectively implements a variable larger than 8 bits with additional registers.

In order to establish the second divisor, i.e., modulus, of the second prescaler within the first microcontroller 13, in step 55 the divisor of the internal prescaler is initially set to a large value to allow accurate counting of the highest frequencies that may be observed. In step 57, the first microcontroller briefly monitors the incoming signal with a second divisor of 4 and counts the zero-crossing transitions of the signal to obtain a prescaling count indicating an approximate frequency of the input signal. The time period for monitoring the frequency of the signal received needs only to be sufficiently long to obtain a rough estimate of the frequency. An exemplary time period for determining the second divisor is 10 microseconds, during which time a sufficient number of zero-crossings, i.e., amplitude transitions, is observed to estimate the frequency with an accuracy of about 1 to 5 MHz and to establish the second divisor set in step 59. The selected divisor, i.e., modulus, is the lowest available divisor that, in light of the frequency specifications of the counter module, achieves accurate counting of zero amplitude transitions at the output of the second prescaler.

In a preferred embodiment, secondary sampling periods are implemented in pairs. For odd-numbered secondary sampling periods, a count is accumulated that is proportional to the number of zero amplitude transitions on the observed electrical line. For even-numbered secondary sampling periods, the counting direction is reversed so that accumulated count is decremented. If the signal frequency is stable, counts will be accumulated in an odd-numbered secondary sampling period at the same rate that they are subtracted in an immediately following even-numbered secondary sampling period. Since these periods have equal duration, a signal of stable frequency will generate a final count at the end of a primary sampling period equal to, or very close to, zero. Conversely, if the signal frequency is different in two sequential secondary sampling periods, the final value will diverge from zero. The actual frequency of the signal is not important for this method of evaluation of frequency stability.

At the start of a secondary sampling period, in step 61, a count accumulation register (16 bits) and TMR0 (8 bits) are cleared, and a timing register is initialized to a predefined value proportional to the duration of a secondary sampling period.

At step 63, the TMR0 "overflow flag" is checked. If this flag is set, at step 65, higher order bits are incremented in, e.g., 256 is added to, the count accumulation register, and the TMR0 "overflow flag" is cleared. At step 67, the timing register is decremented. At step 69, if the timing register has not reached zero, the software loops back to step 63 and continues maintaining the count accumulation register until the completion of this secondary sampling period.

When the test at step 69 shows that the timing register has reached zero, this secondary sampling period is complete. At step 71, the value of TMR0 is added to the count accumulation register, yielding a total value that represents the number of counts during the secondary sampling period.

At step 73, the timing register is reset to the predefined value proportional to the duration of a secondary sampling period, and TMR0 is cleared. Steps 75, 77, 79 and 81 are directly analogous to steps 63, 65, 67 and 69, excepting that in step 77, higher order bits are decremented in, e.g., 256 is subtracted from, the count accumulation register.

By counting in opposite directions during two secondary sampling periods of equal duration, a difference in counted events is directly obtained. A stable frequency will generate a stable rate of transitions, yielding identical counts within a quantization error of plus or minus one, as an effect arising from the analog-to-digital conversion. Unstable frequencies will yield counts that vary between secondary sampling periods.

When the test at step 81 shows that the timing register has reached zero, this second secondary sampling period is complete. Then, at step 83, the value of TMR0 is subtracted from the count accumulation register, yielding a difference in counts or transitions between these two successive secondary sampling periods.

At step 83, a test is applied to determine frequency stability. If the value of the count accumulation register is within a predetermined range, such as [−1, +1], the frequency is considered stable. If the count accumulation register is outside this range, there is evidence that the frequency is unstable, and at step 87 a reset signal is sent to second microcontroller 15. In either case, the software returns to step 55 and initiates a new pair of secondary sampling periods.

Two-Chip Embodiment—Frequency Counter

Figure 8:
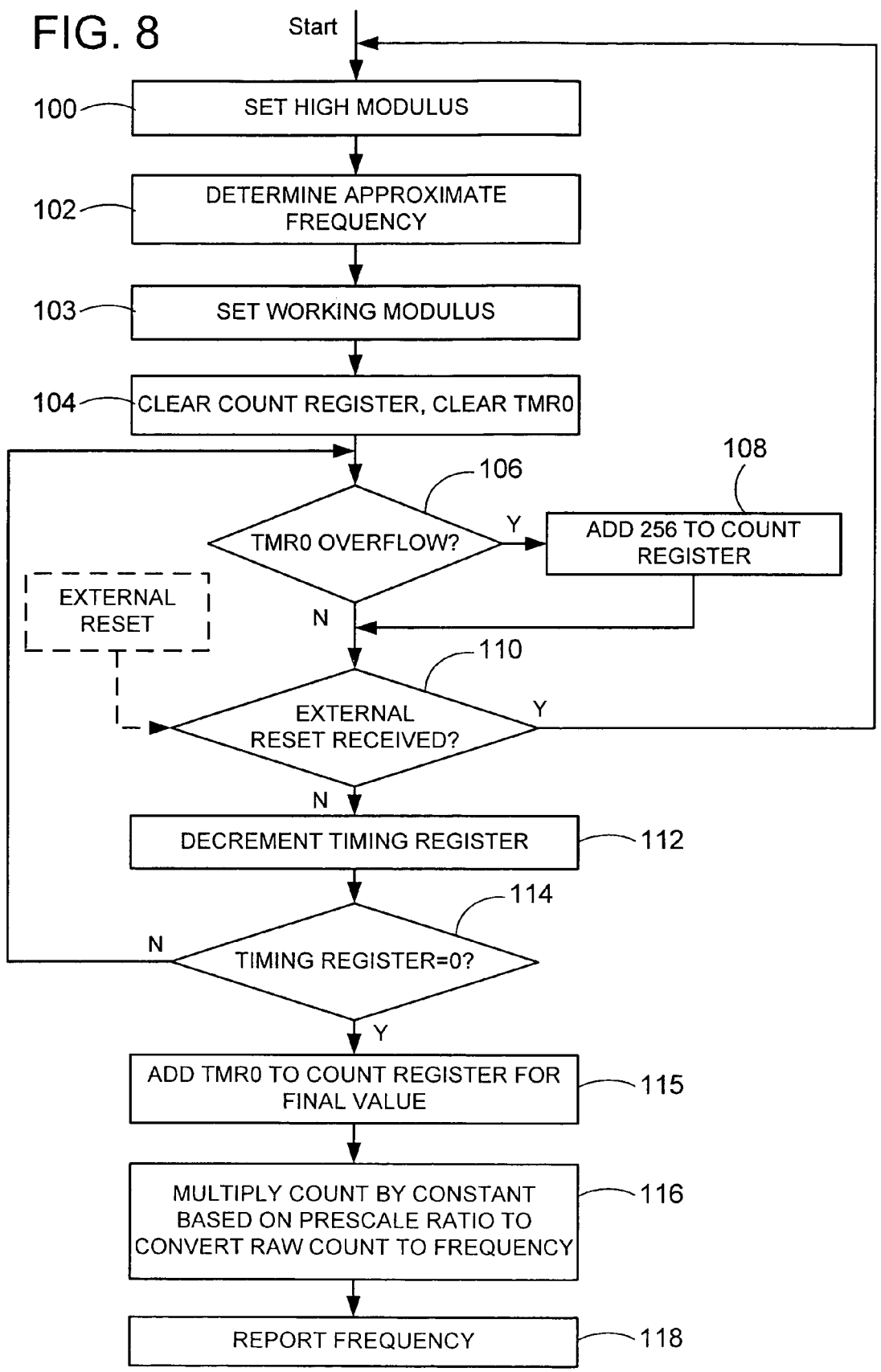
FIG. 8 is a flow chart illustrating a method of determining the frequency of a dominant signal according to an embodiment of the invention.

Many elements of the operation of second microcontroller 15, described with respect to FIG. 8 for one embodiment, directly parallel the process described for first microcontroller 13. In a preferred embodiment, all counts flow though the automatic counting process of free-running counter module TMR0.

In order to establish the second divisor, i.e., modulus, of the second prescaler within the second microcontroller 15, in step 100, the internal prescaler is initially set to a large value for accurate counting of the highest frequencies that may be observed. In step 102, the second microcontroller briefly monitors the incoming signal with a second divisor of 4 and counts the zero-crossing transitions of the signal to obtain a prescaling count indicating an approximate frequency of the input signal. The time period for monitoring the frequency of the signal received needs only to be sufficiently long to obtain a rough estimate of the frequency. An exemplary time period for determining the second divisor is 10 microseconds, during which time a sufficient number of zero-crossings, i.e., amplitude transitions, is observed to estimate the frequency with an accuracy of about 1 to 5 MHz and establish the second divisor set in step 103. The selected divisor, i.e., modulus, is the lowest available prescaler setting that, in light of the frequency specifications of the counter module, provides accurate counting of zero amplitude transitions at the output of the second prescaler.

At the start of the primary sampling period, in step 104, a count accumulation register (24 bits) and TMR0 (8 bits) are cleared, and a timing register is initialized to a predefined value proportional to the duration of the primary sampling period.

At step 106, the TMR0 "overflow flag" is checked. If this flag is set, at step 108, higher order bits are incremented in, e.g., 256 is added to, the count accumulation register, and the TMR0 "overflow flag" is cleared.

At step 110, an external reset input is checked. If the external reset input state indicates "reset", the current counting process is terminated and the process restarts with step 100. The current count presumably does not reflect the frequency of signal, based on the evidence from the first microcontroller 13 that indicates frequency instability at the output of the first prescaler 9. The application of this test, leading to the conditional termination of an ongoing frequency count, discriminates between validity and invalidity of the ongoing frequency count even before that count is complete. This testing represents a fundamental difference between the operation of the second microcontroller 15 and prior art frequency counters.

At step 112, the timing register is decremented. At step 114, if the timing register has not reached zero, the software loops back to step 106 and continues the count accumulation until the completion of the secondary sampling period.

When the test at step 114 shows that the timing register has reached zero, the primary sampling period is complete. Then, at step 115, the value of TMR0 is added to the count accumulation register, yielding a total value that represents the number of counts over the duration of the primary sampling period.

If TMR0 has overflowed between the final check of the "overflow flag" e.g., execution of step 106, and the execution of step 115, this overflow must be taken into account. An overflow can occur at any time so a final check of this flag prior to the reading the count of TMR0 will be inconclusive. A check of the flag after the reading of TMR0 could indicate an overflow that occurred after reading the count. To remove ambiguity, as part of step 115, immediately following the reading of the count of TMR0, a test is applied to determine if the following conditions are true: TMR0 overflow flag is set and the high-order bit read from TMR0 is clear. If these conditions are true, the overflow preceded the reading of the count, and 256 is added to the count accumulation register.

At step 116, this count value is converted to a frequency by multiplying the count by the total effective prescaler divisor, and dividing by the duration of the primary sampling period. Then, at step 118, this frequency is reported to radio receiver A. The process can then be re-started by returning to step 100.

Two-Chip Embodiment—Variations on Counting Techniques

In the two-chip embodiment just described, the reset line from the first microcontroller 13 is strobed, i.e., a reset signal is sent, in the event of frequency instability, but the line is normally quiescent. In an alternative implementation, this reset line is set or cleared in response to each comparison test result, and left in the current state until an opposite result is obtained. This set or clear line maintenance can be used to inhibit any counting by the second microcontroller 15 during extended periods when there is no stable signal for which frequency may be determined, reducing resource utilization of the second microcontroller 15.

In the two-chip alternative embodiment just described, the counter register TMR0 is cleared at the start of certain sampling periods. In an alternative, the count value of TMR0 may be read and stored at these times, and this initial value subtracted from the count accumulation register to obtain a normalized count result for the sampling period. This method uses a counter module which cannot be disturbed or written into during this process.

In the two-chip alternative embodiment just described, there is a time interval between secondary sampling periods used for analysis of results. In an alternative, the count value read from TMR0 at the end of one sampling period may be stored and also utilized as described above, as an offset from a starting TMR0 value of zero to be subtracted from the accumulated count of the next secondary sampling period. This step eliminates gaps between secondary sampling periods, so that frequency stability can be evaluated for the entire interval of the primary sampling period.

In the two-chip alternative embodiment just described, counting in a second secondary sampling period is downward, i.e., subtractive. In an alternative, at the transition between the first and second secondary sampling periods, the sign of the count accumulation register may be reversed, e.g., multiplication by negative one, and the count in the second secondary sampling period may then be upwards, i.e., additive. This change in sign may be useful in circumstances where the counting apparatus or method has a bias towards additive counting.

In the two-chip embodiment just described, counting in a second secondary sampling period is downward, i.e., subtractive. In an alternative, the final value of the count accumulation register is stored after the first secondary sampling period, defined as a "base count". The count accumulation register is then cleared, and a new additive count begins from zero, during a second secondary sampling period. After the completion of that second secondary sampling period, one count is subtracted from the other count to obtain a difference for comparison to the predetermined allowed difference that still indicates agreement.

Instead of subtraction, an exclusive-or operation may be implemented to compare count values. In this implementation, mismatches in one or more low significant bits may be disregarded.

In the two-chip embodiment just described, secondary sampling periods are subject to comparison in pairs of secondary sampling periods that are adjacent in time. The method may also be applied to pairs of secondary sampling periods that are not adjacent in time. However, for optimal performance, it is recommended that the comparisons use two secondary sampling periods that at least partly overlap one primary sampling period.

As an alternative, the final value of the count accumulation register is stored after the first secondary sampling period, i.e., the "base count", and loaded into a count accumulation register at the start of a plurality subsequent secondary sampling periods. This process is repeated until an accumulated count value is out of range. At that point, the count from the last, i.e., previous, secondary sampling period or from the next secondary sampling period may be used as a new "base count". In this implementation, the count from a single primary sampling period may be compared with a plurality of subsequent secondary sampling periods.

As another alternative, an additional line connects the first microcontroller 13 and the second microcontroller 15, to trigger simultaneous start of a primary sampling period with a secondary sampling period. This "start line" may be under the control of either of the microcontrollers, or it may be an input to both microcontrollers under the control of an external device. This phase alignment between primary and secondary sampling periods ensures that the start of a primary sampling period is evaluated for frequency stability, and prevents time prior to the start of the primary sampling period, which would not contribute to the frequency determination, from being included in the evaluation of frequency stability.

In a further alternative, the first microcontroller 13 reports to the second microcontroller 15 when the result of comparisons of counts collected during pairs of secondary sampling periods is consistent with frequency stability. The second microcontroller 15 waits to report a frequency determination until the second microcontroller 15 indicates a completion of the primary sampling period, indicating that the end of the primary sampling period remained consistent with the hypothesis of a stable frequency.

In yet another alternative, the second microcontroller 15 waits for a predetermined time after the end of a primary sampling period. If no reset signal is sent by the first microcontroller 13 in that waiting time, the second microcontroller 15 reports the frequency determined. If a count from a secondary sampling period, at the end of the primary sampling period, indicates an unstable frequency, the first microcontroller 13 is triggered to discard the result, even if the reset instruction is sent after the completion of the primary sampling period. The absence of such a reset signal in that waiting time period is interpreted as no detection of frequency instability at the end of the primary sampling period.

In a preferred embodiment, the first microcontroller 13 sends a reset pulse when a count from a completed secondary sampling period indicates frequency instability. Alternatively, the first microcontroller 13 monitors the accumulating count, and triggers a reset pulse during a secondary sampling period if the accumulating count exceeds a threshold that ensures frequency instability. For example, if counting away from zero, a count exceeds the base count plus the maximum permitted count variance, the condition for indicating frequency instability is met. If counting towards zero and the count exceeds the maximum permitted value beyond zero, the condition for frequency instability is also met. A reset may be declared immediately if a result of frequency instability is ensured.

Single Chip Embodiment—Erosion Alternative

Figure 9:
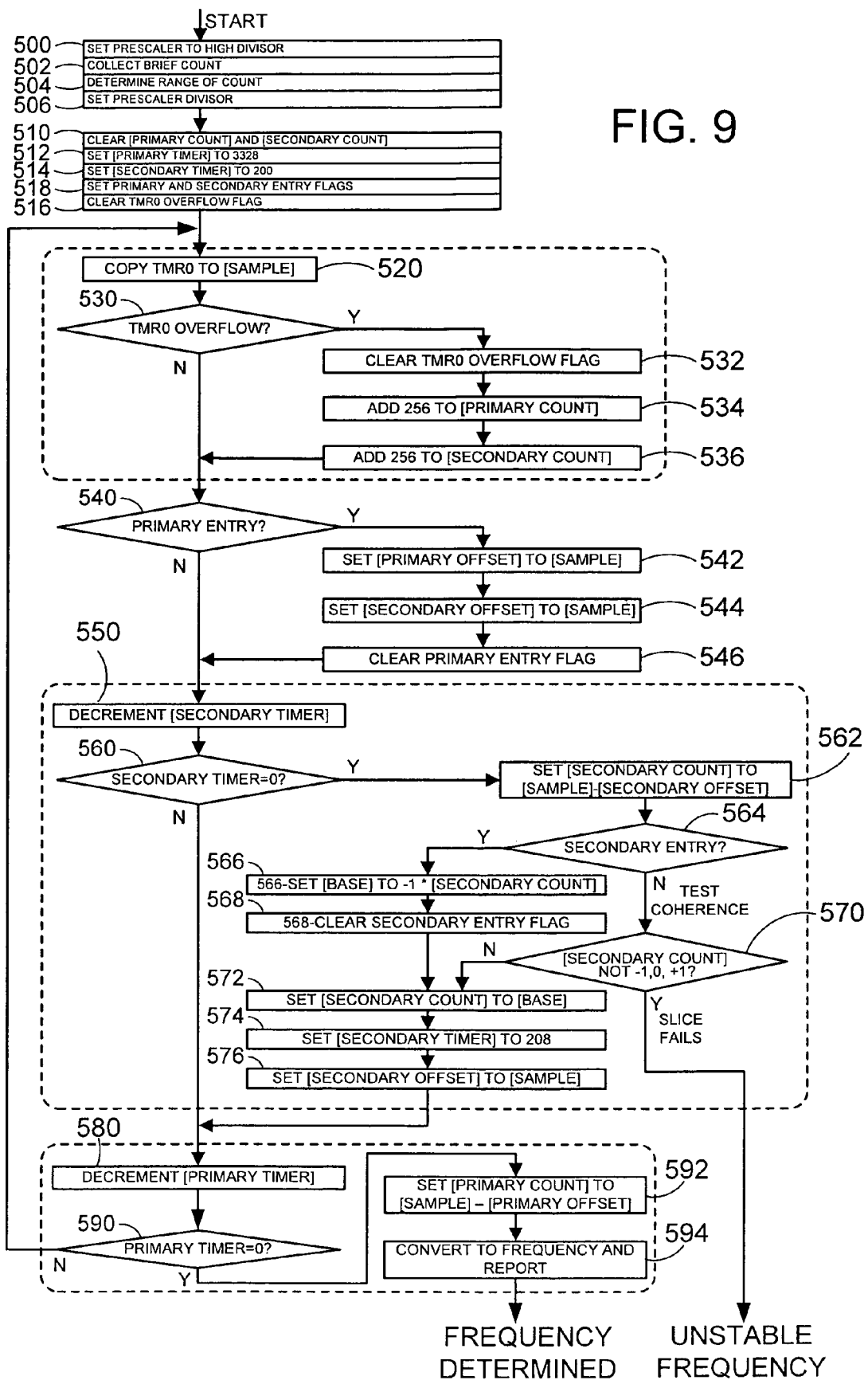
FIG. 9 is a flow chart illustrating a frequency determining method according to an embodiment of the invention.

Another method for implementing the counting process is illustrated in the flowchart of FIG. 9, using apparatus as shown in FIG. 1. This method uses a single microcontroller, for example, a PIC 12C672, and again makes use of a free-running counter module, such as the TMR0 that has been previously described. In this implementation, TMR0 is never cleared or written into; the free-running timer is merely observed.

At the start, a divisor, i.e., modulus, for the dynamic second prescaler is selected. In step 500, this prescaler is set to a high initial value, to avoid count errors for the highest frequencies that may be observed. In step 502, a brief count is accumulated. In step 504, this count is compared to preselected thresholds corresponding to breakpoints between different prescaler divisor settings selected to obtain best performance from the prescaler. In step 506, this indicated prescaler divisor is selected.

Registers are then initialized. In step 510, two count registers are cleared, one register corresponding to a primary sampling period, and the other register corresponding to a secondary sampling period.

In steps 512 and 514, two timer registers, which are not free-running timers but are static registers, are set to initial values. These initial values correspond to the number of loop iterations required to complete a primary sampling period and a secondary sampling period, respectively. In this exemplary embodiment, each "loop operation" takes exactly 100 instruction cycles of the microcontroller, which operates at 2.6 million instructions per second. The secondary timing register is given an initial value of 208, so that each secondary sampling period will integrate over 20800 instruction cycles, i.e., 8 milliseconds. The primary timing register is given an initial value of 3328, so that a frequency count is obtained over a primary sampling period integrating over 128 milliseconds. These specific values are representative numbers, and may be adjusted for a particular application.

At step 516, two entry flags are set for indicating a first passage through the primary and secondary sampling logic. At step 518, the "overflow flag" for TMR0 is cleared.

At this point, a counting loop is entered. Attention is given to the number of instructions taken on every execution path; every iteration of the loop takes exactly the same execution time, such as 400 clock cycles. Thus, a count of executed loop iterations can serve as a precise timing measurement, even in the absence of an available free-running timer in the microcontroller.

The total count for any sampling period, primary or secondary, will correspond to the number of zero-crossings, i.e., zero amplitude transitions, at the microcontroller input pin to TMR0 between the start of one counting loop and the start of another counting loop exactly n iterations later. The number n is the initial value for the corresponding timer register set in step 512. This count will be calculated in the following manner. Every overflow of TMR0, which happens once for every 256 transitions, will result in 256 being added to the count register. The starting value of TMR0, at the start of the sampling period is subtracted from the count, to eliminate a contribution from before the start of the sampling period. The final value of TMR0, at the end of the sampling period, is added to the count, to include counts that took place since the last overflow event.

An important variation concerns the secondary sampling periods. In the secondary sampling periods, the starting count, except for the first slice, is equal to –X, where X is the total count observed during the first slice. Transitions during subsequent secondary sampling periods reduce the magnitude of the count in the count register, effectively eroding the starting value. The final "count" will therefore be a direct expression of the difference between the number of transitions in the first and most recent secondary sampling periods, not an actual numeric count of transitions during this slice. If this erosion process leaves a final value of –1, 0 or +1, then the actual numbers of transitions in these two slices is equivalent within an expected quantization error.

At the start of every counting loop, in step 520, the count in TMR0 is sampled and copied into a "sample register". This is the only observation made of the count in TMR0, and all counts determined will reflect the counts that occur between the samples at the start of two specific loop iterations. In step 530, the TMR0 overflow flag is sampled, and copied to a temporary flag register. If this copied value is true, then a TMR0 overflow will be handled during this loop iteration. Alternatively, if this copied value is false, then no TMR0 overflow will be handled, even if such an overflow occurs later during this loop iteration; the overflow will instead be handled during the next loop iteration. In this manner, a change in the count in TMR0 and its overflow flag will reflect counts that are attributed to the time interval of the prior loop iteration.

To ensure that an overflow that may occur in the brief interval between steps 520 and 530 is handled in the next loop iteration, as part of step 530 the copied flag is set to false if the high bit of the "sample register" is set. Provided that the loop iterations are sufficiently fast that TMR0 cannot advance by more than 127 during each loop, then this combination of bits at step 530, "sample register" high bit set, and TMR0 overflow flag set, indicates that the overflow took place after TMR0 was read. In this case, the TMR0 overflow flag itself should not be cleared, so that the overflow signature remains present for the next loop iteration.

If step 530 indicates that a TMR0 overflow will be handled, three things happen. In step 532, the TMR0 overflow flag is cleared. In steps 534 and 536, 256 is added to each of the count registers.

On the first passage through this loop, the initial value of TMR0 is stored so that it may be subtracted from the total count for the primary and secondary sampling periods. Any counts in TMR0 at loop entry should not contribute to the final count, but they will lead to an overflow event and be added into the count register before 256 transitions have taken place during the sampling period. Step 540 tests the primary entry flag, which indicates first passage through this loop. If true, at steps 542 and 544, the initial value of TMR0 is copied from the "sample register" to the "primary offset register" and to the "secondary offset register". Then, at step 546, the primary entry flag is cleared to ensure that this copying is only executed once.

At step 550, the secondary timer register is decremented. The primary and secondary timer registers are preferably maintained in software to avoid selecting a microcontroller device with available free-running timers. Then, at step 560, a test is applied to determine if the secondary timer register has reached zero, indicating the end of a secondary sampling period, i.e., a "slice". If true, a total count is calculated for this secondary sampling period at step 562 in the following manner: the count of the "sample register" is added to the secondary count register, and the count of the "secondary offset register" is subtracted from the secondary count register.

Still within the conditional loop from step 560, at step 564, the secondary entry flag is tested. If this iteration is the first time through step 562, i.e., the end of the first slice, then at step 566, a "base register" is set to –X, where X is the slice count. In effect, this is a multiplication by negative one, but a standard negation, i.e., XOR all bits and add one, is more efficient. At step 568, the secondary entry flag is cleared to ensure that setting of the base register is only executed once.

If this iteration is not the first time through step 562, i.e., the secondary entry flag was false at step 564, a "coherence test" is applied at step 570. As described below, the result of a "slice count" is a direct representation of the difference in the number of transitions in the first and most recent slices. Therefore, a test is applied to determine whether the final value in the secondary count register is within the range –1, 0, or +1. If false, there is evidence that the signal is unstable. Then, the primary sampling period is immediately terminated and the counting process may restart at step 500. If true, then the observation of this slice is consistent with the hypothesis that a stable signal exists.

At step 572, the secondary count register is set to the count of the base register, which has a negative value equal in magnitude to the count of the first slice. This setting prepares the secondary count register for the erosion process of the next secondary sampling period. At step 574, the secondary timer register is reset to the initial value that produces the desired sampling interval. Then, at step 576, the sample register, which contains the TMR0 count value at the start of the new secondary sampling period, is saved to the secondary offset register. The count in the secondary offset register is used later for adjusting the total count value for the new secondary sampling period, removing any overcount due to TMR0 events prior to the start of the new secondary sampling period.

With step 580, the paths that split at step 560 are rejoined. Since the "end of slice" processing takes a certain time, the "midslice" code path has a delay, i.e., no operation instructions, that take an equal time, to preserve the fixed timing of each loop iteration on all paths.

At step 580, the primary timing register is decremented, and at step 590 a test is applied to determine if the primary timing register has reached zero. This test is applied after the "end of slice" processing, instead of immediately upon decrement of this timing register. Therefore, a final slice, terminating at the same loop iteration as the primary sampling period, may be subjected to a coherence test before determining the frequency. If the primary timing register has not reached zero, the process reverts to step 520 and executes an additional loop iteration.

If the primary timing register has reached zero, then at step 592 a final value for the primary count is calculated, in a manner very similar to the "end of slice" process at step 562. At step 594 a frequency is determined, using a mathematical formula adjusting for the total effective prescaler divisor and the duration of the primary sampling period.

Using Interrupt Service Routines in Determining Frequency

The exemplary implementations described above have many specific aspects that are optimized for the specific characteristics of the exemplary microprocessor, the PIC12C672, which was selected for its simplicity and low cost. This exemplary microprocessor has an 8-bit counting module TMR0, but no additional module that could be used as a free-running timer. Persons of ordinary skill in the art can devise, based on the foregoing description, alternative counting techniques for use with other microcontrollers, for example, devices, such as field programmable gate arrays and stand-alone counter devices, or microcontrollers with more sophisticated free-running counter elements.

If a counter module "overflow flag" is configured to trigger an interrupt service routine (ISR), then explicit software testing of this overflow flag is not required during the main software operations, and maintenance of a count accumulation register can be limited to operations within the ISR. One the other hand, if a counter module has enough bits to represent the largest values that may be counted, there is no need for observation of an "overflow flag" from the counter module. These reductions in software tasking are desirable in cases where the software has multitasking responsibilities.

If a free-running timer is available for measuring the duration of a primary or secondary sampling period, there is no need for software to maintain a timing register. The expiration of a free-running timer may be configured to trigger an ISR, so that software operations at the expiration of a sampling period can be automatically triggered at the appropriate time.

These alternatives may be combined. For example, if a free-running timer is utilized in conjunction with a counter module with sufficient bits for storing the maximum values which may be counted, software operations required during a sampling period are reduced to nearly nothing. In this case, the entire operation can be isolated to initialization processes, with ISR operations taking place between sampling periods.

Frequency Determination—ISR/Slice Embodiment

Figure 10:
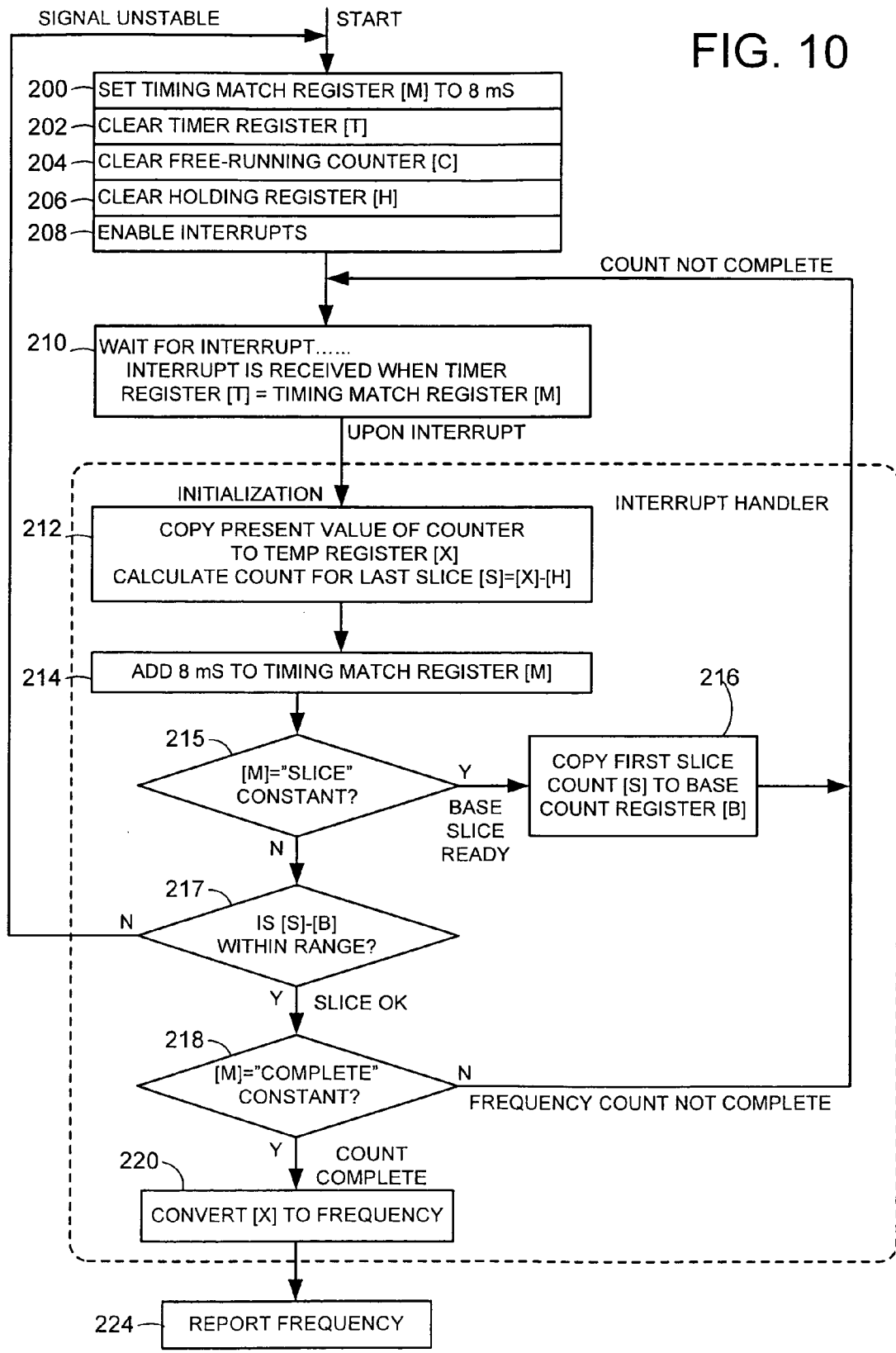
FIG. 10 is a flow chart illustrating a frequency determining method according to an embodiment of the invention.

In some applications, it is desirable to configure a frequency counter for background operation on a microcontroller, so that the microcontroller is free to perform other tasks, such as control of the device incorporating the frequency counter. An exemplary embodiment of such a frequency determination method is illustrated in FIG. 10, using a frequency determination apparatus such as is shown in FIG. 1. In this embodiment, a single microcontroller 11 is utilized to perform both frequency measurement and frequency stability verification functions.

To start the frequency determination process, a series of registers are set to initial states. At step 200, a "timing match register" is set to the duration of a secondary sampling period, which is taken in this example to be 8 milliseconds. At step 202, a free-running timer is set to zero. At step 204, a free-running counter, similar to TMR0 but sufficient to accommodate a total count over a primary sampling period, is set to zero. At step 206, a "holding register" is set to zero. Then, at step 208, interrupts are enabled. When the free-running timer matches the value stored in the "timing match register", the microcontroller 11 will automatically generate an interrupt and trigger an ISR. Until then, the microcontroller 11 is free to perform other functions and tasks.

The automatic monitoring for equality between the timer and the timing match register is represented by step 210. When this equality occurs, the end of a secondary sampling period is indicated, and a series of activities are performed within an ISR.

At step 212, the total count over the previous secondary sampling period is calculated by subtracting the holding register from the free-running counter, and stored in a "slice count register". To ensure precise timings, it may be necessary to correct for variation in the interrupt latency period, since the time to execute an ISR typically varies depending on the state of the microcontroller at the moment when the interrupt event took place. This timing may be controlled by monitoring the free-running timer as part of step 212, and collecting the sample for the "slice count register" when an exact timer value is reached.

At step 214, the "timing match register" is advanced by the duration of a secondary sampling period, so that this register now reflects the end time of the next secondary sampling period.

At step 215, a test is applied to determine if the "timing match register" has the value expected at the end of the first secondary sampling period, e.g., at 16 milliseconds. If so, at step 216 the "slice count register" is copied to a "base count register" for comparison to the count values obtained in subsequent secondary sampling periods. The ISR is then terminated, and the process reverts to step 210, waiting for the end of the second secondary sampling period.

Alternatively, if the "timing match register" does not have this specific value, the process advances to step 218 and compares the "slice register" with the "base count register". If the values are significantly different, for example, differ by an absolute value greater than one, then the frequency is not stable. The ISR is then terminated, the partially accumulated count is discarded, and the process reverts to step 200 to start a new frequency determination process, including a new primary sampling period.

Alternatively, if the counts of the "slice register" and "base count register" are sufficiently similar, a test is applied at step 220 to determine if the "timing match register" has the value expected at the end of the primary sampling period, e.g., 8 milliseconds+N slices*8 milliseconds, where N is the number of secondary sampling periods within a primary sampling period. If the "timing match register" does not have this value, then the primary sampling period is not complete, the ISR is terminated, and the process reverts to step 210 to wait for the end of the next secondary sampling period.

Alternatively, if the "timing match register" has a value indicating the end of a primary sampling period, then at step 222 a frequency is determined by multiplying the free-running counter by a scaling factor, representing the total prescaler divisor (from both prescalers, if applicable) and the duration of the primary sampling period. This frequency may then be reported at step 224.

In a configuration where microcontroller 11 does not include a free-running counter with sufficient bits to represent the total count that may be accumulated over a primary sampling period, then overflows from the counter may be trapped via ISR and upper bits maintained by an ISR in a software-managed count register.

Frequency Determination—ISR Bi-Directional Embodiment

Figure 11:
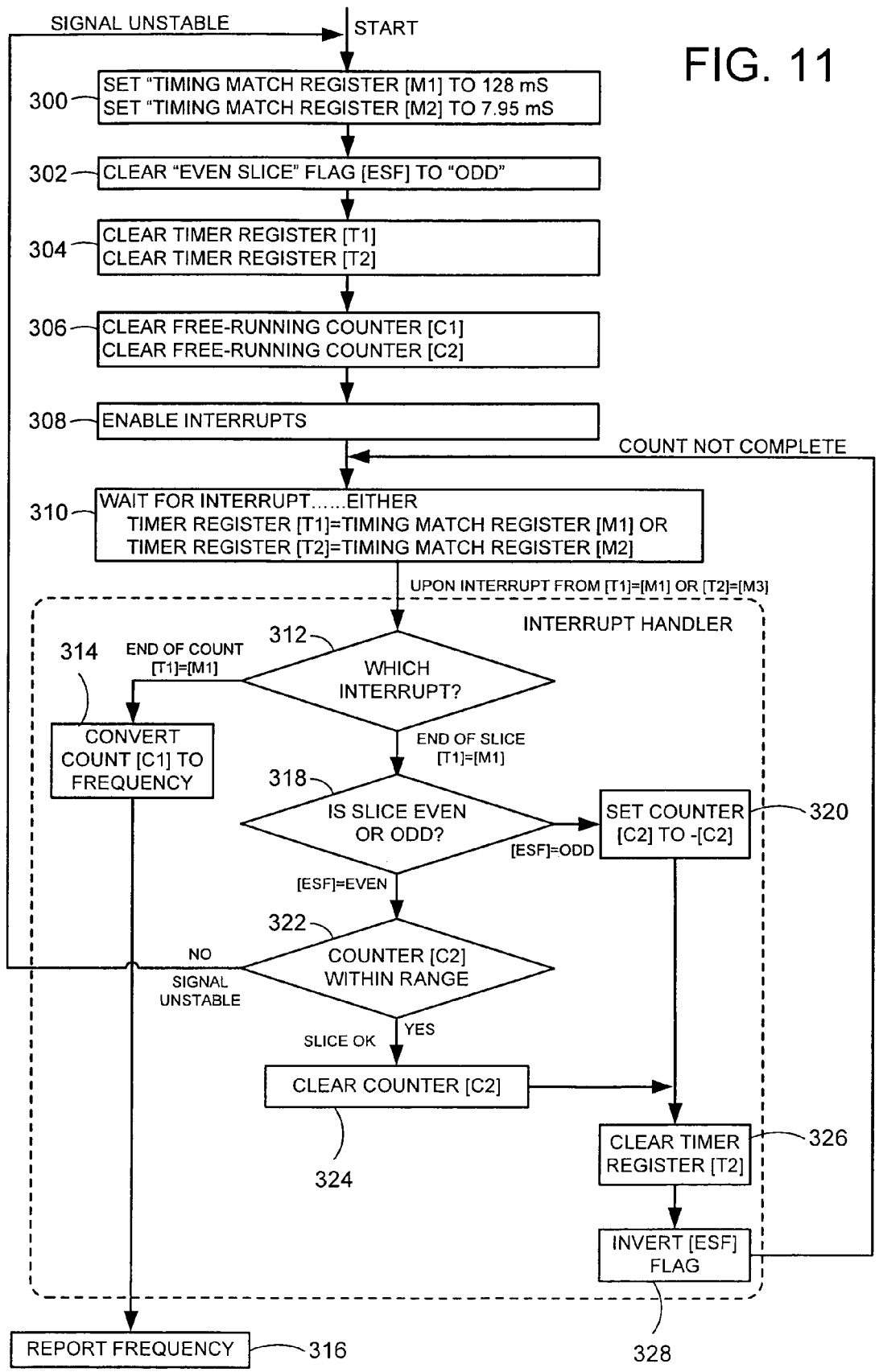
FIG. 11 is a flow chart illustrating a frequency determining method according to an embodiment of the invention.

The flow chart of FIG. 11 illustrates another embodiment of a frequency determination method, using a frequency determination apparatus such as is shown in FIG. 1. In this embodiment, the microcontroller 11 provides both frequency measurement and frequency stability verification functions.

To start the frequency determination process, registers are set to initial states. At step 300, a "first timing match register" is set to the duration of a primary sampling period, which, in this example, is 128 milliseconds, and a "second timing match register" is set to the duration of a secondary sampling period, which, in this example, is 7.95 milliseconds. At step 302, a directional Boolean flag "ESF" is cleared to an "odd" state; this flag is used to indicate whether a slice is "odd", i.e., counting away from zero, or "even" i.e., counting towards zero, as discussed below. At step 304, two timer registers, respectively paired with the first and second timing match registers, are cleared to zero. At step 306, two free-running counters are cleared. Each free-running counter is configured to advance automatically in response to zero-crossings of an RF signal, as seen through appropriate prescalers.

Then, at step 308, interrupts are enabled. When either free-running timer matches the value stored in its corresponding "timing match register", the microcontroller 11 will automatically generate an interrupt and trigger an ISR. Until then, the microcontroller 11 is free to perform other functions and tasks.

The automatic monitor for equality between a timer and its timing match register is represented by step 310. When this equality occurs, the end of a primary or secondary sampling period is indicated, and a series of activities are performed within an ISR.

In the ISR, the first task, at step 312, is to determine which type of interrupt signal has been generated, i.e., which timer has matched its corresponding timing match register. If the first timer has matched, then the primary sampling period is complete, and a frequency may be determined. At step 314, a frequency is determined by multiplying the count within the first free-running counter by a scaling factor representing the total prescaler divisor, from both prescalers, if applicable, and the clock duration of the primary sampling period. This frequency may then be reported at step 316.

Alternatively, if the second timer has matched, then a secondary sampling period is complete. The following logic depends upon whether this is an "even" or "odd" slice, as represented by the value of ESF. During "odd" slices, a count is accumulated; between an "odd" and "even" slice, the sign is reversed; during "even" slices, further counts decrement the count; and between "even" and "odd" slices the resulting value is compared to zero to determine whether the signal frequency was constant during these two secondary sampling periods. The ESF is tested at step 318.

If ESF indicates an "odd" slice, the sign of the second counter is reversed at step 320, e.g., the counter count is multiplied by −1. If ESF indicates an "even" slice, the value of the second counter is compared to a predetermined range, e.g., [−1, +1]), at step 322. If the count is outside this range, then the frequency observed during the prior two secondary sampling periods was not stable, the ISR is terminated, and a new frequency determination process is initiated at step 300. If the count is within this range, then the frequency has been stable over these two secondary sampling periods, and the second counter is cleared to zero at step 324.

After the ESF-dependent operations are complete, e.g., after steps 320 or 324 have concluded, and if the ISR has not been terminated due to a determination of frequency instability, the process prepares for the next secondary sampling period. At step 326, the second timer is cleared, and, at step 328, the ESF is inverted to the opposite state. Then the ISR terminates, and the process reverts to step 310 to wait for the next end of a primary or secondary sampling period.

When the microcontroller 11 does not include a free-running counter with sufficient bits to represent the total count that may be accumulated over a primary sampling period, overflows from the counter may be trapped via ISR and upper bits maintained by the ISR in a software-managed count register.

Comparison Alternatives

The principle of frequency stability verification using counts acquired during secondary sampling periods relates to the mathematical property that a coherent signal will consistently produce one of two adjacent count values. This property can be verified from a series of count values. Some of these methods have already been described here with respect to specific embodiments. However, additional illustrative methods, usable as part of the invention, are now discussed.

In applying a coherence test, a counter may make several independent frequency determinations, and only use a result that is consistent across multiple readings, within a predetermined frequency error tolerance, or within a predetermined count variation. Alternatively, a statistical test may be applied.

In applying a frequency stability test, a count for a single selected secondary frequency sampling period may be compared with counts for other secondary sampling periods during an interval. The selected secondary sampling period may be any in the series of secondary sampling periods, but it is generally easiest to select the first secondary sampling period. Counts accumulated by pairs of secondary sampling periods adjacent in time are compared throughout an interval, so each period is compared with its immediate predecessor and successor. This comparison is a less stringent test, since a signal with a slowly drifting frequency might pass a coherence test between all adjacent pairs of slice counts, yet have a count that drifts by more than a quantization error over a larger series of counts, for example, if the count increases by 1 during each successive slice.

In some described embodiments, the counts of pairs of secondary sampling periods adjacent in time are compared, all slice data is discarded, and the counts of the following pair of secondary sampling periods are compared with each other. This approach to determining frequency stability is even less stringent than the preceding example, but allows all information about count values to be discarded frequently. Frequent discarding may be useful where static data retention is undesirable, for example, due to memory limitations. Alternatively, two counts may be collected in different memory locations, and then subtracted to obtain a difference.

In still another verification process, a counter is initialized to a value with a magnitude reflecting the count during a prior secondary sampling period with which the new secondary sampling period will be compared. The count process is used to reduce the magnitude of the count in this counter. This reduction eliminates acquiring a count for the second secondary sampling period, and the subtraction of such a count from a count obtained in a prior secondary sampling period. The elimination of the subtraction step may make this process slightly faster on some devices.

In such an "erosion" process, an interesting implementation is possible. At a slice boundary after a count has been collected in the first of a pair of secondary sampling periods, the sign is reversed in the counting register, e.g., multiplied by −1, or in a free-running counter the direction of count may be reversed, so events cause decrementing instead of incrementing. Then, the "erosion" takes place in the same register that the original count was taken, with no static storage required for any secondary sampling period count. This technique may be efficient in minimizing memory usage.

More generally, it may be desirable to apply a more stringent test, since many of the methods presented will actually permit comparison of any of three adjacent count values. In another alternative, comparisons of a single secondary sampling period with a plurality of secondary sampling periods are made, by additive or subtractive counting in subsequent periods. The optimal test for frequency stability comprises a test in which all counts in a series have been one of two adjacent values. As a side-effect of the analog-to-digital conversion, a pure stable frequency may produce one of two adjacent count values, depending on the phasing of the signal at the start of a sampling period. Such a test may be more restrictive than an allowance of a variation of one count, for example, because it can constrain differences of one relative to a base count to a single sign. For example, a "+1 allowed" and "−1 allowed" flag may be set at the start of a first secondary sampling period. If a comparison to a subsequent secondary sampling period produces either +1 or −1, the "allowed" flag for the other of these values is cleared. If the "allowed" flag for the observed value is clear, then the frequency is determined to be unstable. Otherwise the process may continue in the same manner as for an exact match between the counts.

In an alternative, counts from secondary sampling periods are converted to frequencies, and a difference in apparent frequency is obtained from subtraction of frequencies calculated from counts of two secondary sampling periods. Then, the step of comparing the difference to a predetermined acceptable range would constitute a comparison of this frequency difference to a predetermined limit for acceptable frequency variation. This test may be desirable if frequency stability is not required to the extent that would be tested with a strict coherence threshold, e.g., if some degree of frequency variation is acceptable for the frequency determination application. This test may also be desirable if the durations of secondary sampling periods are not stable, since a frequency representation allows a renormalization of counts acquired during secondary sampling periods of variable duration.

The function of counting secondary sampling periods is to verify signal stability. While coherence is an optimal mathematical test for this purpose, a wider threshold than plus or minus one may be desirable, and the present invention includes such variations. A practical limit for such a threshold may be reached when count variations of that magnitude indicate frequency variation of sufficient magnitude to create uncertainty over the operating broadcast channel of the signal transmitter. For example, if a difference in counts, if translated to a frequency, would indicate a difference in signal frequency of 50 kHz, in a region of the spectrum where allocated channels are spaced at 12.5 kHz intervals, it is highly unlikely that an accurate frequency may be determined. However, the selection of a threshold involves a trade-off between the costs of false positives, i.e., frequency determinations, and false negatives, discarded or prematurely terminated frequency counts that could have produced an indication of a correct channel. That trade-off will obviously vary for different applications. When a tuner is available, and otherwise unused or performing no essential function, the cost of a false positive may be minimal because an indicated frequency may be tested without significant effort with the squelch and/or window tests.

In the preferred embodiment, secondary sampling periods are disjoint, in that there is no time that falls within more than one secondary sampling period. In an alternative, secondary sampling periods may overlap.

In another alternative, one or more secondary sampling periods may fall entirely outside the primary sampling period. While it is recommended that the secondary sampling periods utilized at least partly overlap the corresponding primary sampling period, it may be adequate for some applications to verify stability on the basis of secondary sampling periods that are near the temporal boundaries of the primary sampling period.

In the case of a series of comparisons utilizing a "base count" obtained prior to a primary sampling period, and continuing throughout the primary sampling period, the fact that the first secondary sampling period preceded the primary sampling period may be inconsequential. Stability is verified throughout the primary sampling period by comparison of each secondary sampling period in this interval to a single reference count.

In the preferred embodiment, secondary sampling periods are of identical duration and utilize identical total effective prescaler values. These common characteristics simplify the count comparisons, because a constant frequency will produce equal counts, within a quantization error of plus or minus one, within a constant time interval. However, the duration of the secondary sampling periods may be varied, and/or the total effective prescaler divisor may be varied, if appropriate mathematical steps are taken to normalize the results between samples, or if variation is absent between pairs of slices that are compared only against each other. Normalization may be conversions to units of frequency, or scaling of counts in proportion to the variation in duration or prescaler divisor prior to comparison, or, with reduced performance, adjusting the frequency stability test threshold so that count variations expected on a stable signal would pass that test. Timing variation may be random, such as keying from whether a prior slice comparison was high or low, pseudorandom, or an unintentional byproduct of other activities.

Detection of frequency instability is possible during a secondary sampling period under some circumstances, without even waiting for the end of that secondary sampling period. For example, during a secondary sampling period, the accumulating count for that secondary sampling period can be compared to thresholds similar to the comparisons ordinarily conducted at the end of the secondary sampling period. If the threshold is violated in an irredeemable way, so that additional counts will only make a bad result worse, then the primary and secondary sampling periods may be terminated, any accumulating counts discarded, and the process restarted. To illustrate one example, in a configuration where a count is accumulated during "odd" slices and then reversed in direction to decrement towards zero during "even" slices, where a final value below −1 is considered a failure of stability, a count below −1 during such an even secondary sampling period is irredeemable. This situation means that frequency instability has been detected, even before the secondary sampling period is complete.

Early termination of primary sampling periods that will not produce a valid result, either during a slice or after a slice comparison, has potential benefits for overall performance. First, early termination permits an immediate restart of a new primary sampling period, increasing the probability that some primary sampling period will be aligned with a brief period of signal stability. The stable period may have a length on the order of the duration of a primary sampling period, increasing effective sensitivity and range of the frequency determination apparatus. Second, early termination reduces the workload and time commitment of a multifunction device, such as a microprocessor also controlling a scanning radio receiver, so that the device may quickly resume other activities in lieu of an immediate restart of a counting process.

Frequency Determination—Capacitance Apparatus

In a preferred embodiment, counts are recorded digitally by a microcontroller. In an alternative embodiment, if the output of first prescaler 9 is conditioned to produce pulses of fixed amplitude and duration, a count may be obtained by charging a capacitor to integrate the output of first prescaler 9 over a specific time interval. Then a microcontroller may read the accumulated charge on the capacitor through an analog-to-digital converter. This value may then be used in lieu of a count.

Signal Strength Tests and Apparatus

In another variation, the frequency determination apparatus operates only if the amplitude presented at the bandpass filter output exceeds a threshold, indicating the probable presence of a dominant signal producing significant energy. In yet another variation, the frequency determination apparatus operates only if the amplitude presented at the bandpass filter output has suddenly increased, exceeding a threshold value that is related, either via an additive factor or a multiplicative scaling factor, to a recent lower amplitude measurement. This increase in radio frequency energy indicates a new signal, presumably an intermittent transmitter source, which appears to dominate the noise level at a recently observed lower amplitude level. Such methods of frequency determination are well known to persons of ordinary skill in the art and may be employed as an element of the present invention.

In another variation, where the bandpass filter includes a plurality of elements with different pass bands, the apparatus is configured so that the frequency determination apparatus accesses the output of an element other than the one selected for presentation to the preamplifier and the radio receiver circuitry. In this configuration, separate switches connect the bandpass filter elements to the radio receiver and the frequency determination apparatus, and each signal path utilizes a distinct preamplifier. This configuration may be undesirable due to greater circuit complexity when the radio receiver is expected to scan frequencies in a wide selection of pass bands. All of the elements of the bandpass filter will be active on a regular basis, providing a wide effective frequency response for the frequency determination apparatus. However, under certain circumstances this greater circuit complexity is acceptable for the increase in performance that is obtained. In this configuration, the output of the bandpass filter presented to the frequency determination apparatus may be a different signal from the output of the bandpass filter presented to the radio receiver.

A counter can be positioned immediately after a bandpass filter possibly with intervening electronic elements. These intervening elements may include a secondary filter that further limits the bandpass, or a frequency converter that shifts a block of RF frequencies to a lower and more easily sampled frequency range. For example, an IF filter can be used for these purposes. A counter monitoring a signal after the IF filter may be easier to implement because the counting occurs at a lower frequency, using less expensive electrical components. Appropriate mathematical conversion is employed to obtain the original frequency prior to the IF filter. This configuration also provides improved sensitivity since the additional bandpass filter removes some noise. It may be advantageous to tune the radio to a series of widely separated frequencies to search the spectrum effectively for signals, so that all frequencies in desired ranges can reach the counter.

Storage and Scanning

Certain frequency agile radio receivers, commonly known as scanners, operate in a "scan mode" wherein the radio tuning is cycled through a set of predetermined frequencies. The frequencies may be identified with information read from a memory, such as the memory 36 of FIGS. 1, 4, and 6. Each tuned frequency is tested for an active signal via a squelch test, and communications on tuned frequencies with active signals are presented via audio circuits or other information display or recording means. The cycling through a set of predetermined frequencies is then resumed upon the end of signal, as determined by further application of the squelch test. These scanned frequencies are identified by first frequency identification codes stored in the memory.

In the present invention, a second frequency identification code is determined with the frequency determination apparatus B and stored in the memory 36, optionally following the passage of a series of verification tests, such as window and/or squelch tests, and other translations, such as the conversion of repeater input to repeater output frequencies as discussed elsewhere herein. Meanwhile, the "scan mode" cycles through frequencies identified through data stored in the memory 36. Thus, the radio receiver can concurrently perform counting and scanning functions, including the scanning of frequencies that have been detected and determined by the frequency determination apparatus B.

This specific feature makes it possible to monitor a combination of known and unknown active frequencies in an environment containing a plurality of intermittent radio frequency signals. For example, when receiving radio signals at an emergency scene, where multiple emergency response agencies are present, neither counting nor scanning alone provides efficient seamless reception of all active frequencies used at the scene. Response to count detections alone, without scanning, does not permit continued monitoring of fading intermittent signals. Scanning alone, without updates to the scan memory from count detections, does not permit the monitoring of signals on frequencies previously unknown to the user. In contrast, concurrent counting and scanning permits the continued monitoring of known, or previously detected, frequencies, while continuing to detect newly introduced frequencies upon first transmission from the scene. The combination of monitoring techniques provides a more complete picture of regional communications activity without special prior knowledge of what frequencies will be used in that region.

Some determined frequencies will not be of interest to a user. Therefore, in variations of the present invention, the user may be provided the option of restricting the determined frequencies recorded in the memory. For example, in one variation, upon determination of the frequency of a signal, the user may be asked to confirm storage, and storage in the memory is contingent upon the confirmation from a keyboard, keypad, button, or similar user interface device. In another variation, a frequency previously stored in the memory may be subject to lockout in response to a user request, in which case the entry is deleted from the memory, and the frequency is identified in a memory accessible to the microprocessor 31 or the microcontroller 11 as locked out and excluded from reception. In some variations, the user may directly request the storage of a frequency identification code in the memory.

In an alternative embodiment, the receiver is tuned to the indicated frequency and a single communication is received, but a second frequency identification code corresponding to the determined frequency is not stored in an active scan memory, such as the memory 36, and there is no subsequent scanned detection of future communications on the frequency determined. In this case, the scan list is unchanged by the determination of frequencies. Local transmissions on a plurality of non-scanned frequencies are automatically detected and monitored in response to the performance of the frequency determination apparatus, and these monitored communications are interlaced with ordinary scanning operations and associated receptions of transmissions on specific known and scanned frequencies of interest.

The frequencies determined by the methods disclosed here may be presented on a numerical display. Alternatively, alphanumeric information associated with the indicated frequency in a memory may be displayed on an alphanumeric display.

Bandplan, Tunable Frequencies, and Frequency Identification Codes

The radio spectrum is divided into discrete frequency regions which are separately allocated for use by regulatory agencies such as the Federal Communications Commission. The set of frequencies which may be allocated for use, or a subset of such frequencies, is called a bandplan. When a frequency is determined based on observations of the local radio frequency environment, and the determined frequency does not exactly match a bandplan frequency, this mismatch is presumably due to inaccuracy in the frequency determination process. Therefore, the system may correct for this inaccuracy by calculating the frequency within the bandplan, or known subset of the bandplan, that is nearest the determined frequency. This calculated frequency is presumably the correct frequency for the signal that has been detected by the frequency determination apparatus.

For much of the radio spectrum, frequencies within the bandplan fall at regular intervals (e.g., every 12.5 hHz). Therefore, it may be more efficient for a radio system to store knowledge of this regularity, for example, that frequencies available for tuning match the formula $F=B+NS$, where F is a tunable frequency, B is a base value, S is a step size, and N is an integer. Several such equations may be used to accommodate variations in bandplan spacing in different portions of the radio frequency spectrum. Some frequencies matching this equation may not be in the bandplan, (e.g., due to an irregularity in the bandplan spacings), but this formula provides an approximation of bandplan knowledge with smaller memory requirements than needed for storing the actual bandplan. Therefore, the system may approximately compensate for inaccuracy in the determination process by calculating the nearest of a set of regularly spaced tunable frequencies matching the formula for an integer N.

When storing references to a given frequency in a memory, such as memory 36, the reference may appear as a frequency identification code corresponding to the actual radio frequency. Numerous formats are possible, such as a binary representation of the frequency value, or integer N related to the frequency by the formula, or a count of cycles per unit time that is proportional to frequency. Similar variations are evident to persons of ordinary skill in the art. Further, it is possible that the specific format or representation for a frequency identification code may change at different points in a process. For example, a frequency determination apparatus may represent frequency as a number of cycles within a specific unit time, whereas a tuner control element may represent frequency as an integer N. Such translations between evident representations are obvious variations on the present invention.

Some transceiver systems use a repeater structure, in which pairs of mobile transmitter repeater input frequencies and repeater output frequencies are assigned and used together. Mobile units transmit using relatively low power on repeater inputs, and a repeater system receives and rebroadcasts the communications on the corresponding repeater output using higher power. This repetition enables communications among geographically distributed mobile units using low power transmission systems. A local mobile unit may dominate the local radio spectrum with these relatively low power transmissions, and the repeater input frequency may be determined with the frequency determination apparatus. However, it is preferred that the repeater output frequency be found and monitored in lieu of the repeater input, because only the output frequency will carry all parties to a conversation. Therefore, the system may test a determined frequency against known repeater input frequencies. If the repeater input frequency is verified, the system can calculate the corresponding repeater output frequency from a ruleset. Then, the system may substitute the repeater output frequency as the frequency determined and subject this repeater output frequency to verification steps, such as squelch or window tests, and store a second frequency identification code corresponding to the repeater output frequency in the memory 36. If a calculated repeater output frequency does not pass verification tests, indicating that there is no signal for reception, then the system may report a second frequency identification code corresponding to the suspected repeater input frequency.

Secondary Identification Codes

In some radio transceiver systems, a secondary identification code is broadcast in conjunction with a transmission. The secondary identification code identifies a distinct transmitter or talkgroup from among a plurality of transmitters or talkgroups that may operate on the same broadcast channel or frequency within the radio spectrum.

Some systems utilize subaudible tones in a secondary identification code. A subaudible tone is typically at least one pure audio tone transmitted together with audio communications. The subaudible tones typically have a frequency below 250 Hz while the audio communications typically may use a frequency range of 300 Hz to 3000 Hz. Therefore, the subaudible tones can be separated from the audio communications with a filter apparatus. A radio receiver, after tuning to a channel carrying a transmission utilizing subaudible tones, may detect these subaudible tones, thereby determining a secondary identification code corresponding to the subaudible tones. Methods and apparatus for determining secondary identification codes from the audio channel of a tuned radio receiver are well known to persons of ordinary skill in the art. Subaudible tones allow a plurality of users to utilize a single broadcast frequency, or a single repeater input/output pair of frequencies, without conflict.

Some trunked radio systems utilize talkgroup codes as a secondary identification code. In a trunked system, a plurality of users utilizes a single set of frequencies configured as a plurality of repeater input/output frequency pairs, and a "talkgroup code" is used to identify a logical subchannel within a trunked communications system. On some trunked systems, talkgroup codes are present as subaudible tones on the same radio frequency with audio communications. On these trunked systems, talkgroup codes are broadcast in digital format on a "control channel" carrying digital information temporarily associating talkgroup codes with repeater frequency pairs. In such systems, users broadcasting over the trunked system are assigned temporary usage of a repeater frequency pair, and users within the system configured to receive transmissions on that talkgroup respond to information on the control channel by tuning a transceiver to the indicated repeater output frequency and receiving communications. Methods and apparatus for monitoring a trunked control channel and determining the temporary assignments between talkgroup codes and repeater input/output frequencies are well known to persons of ordinary skill in the art. In the present invention, for example, if the frequency determination apparatus determines a frequency known to be a repeater input within a trunked radio system utilizing a control channel, the radio receiver may tune to a frequency known to carry the control signal data for that trunked system, and determine what talkgroup code, e.g., secondary identification code, is associated with the determined frequency. If a talkgroup code is present as subaudible tones on the repeater input frequency, a secondary identification code corresponding to these tones may be directly determined without tuning to a control channel.

For frequency determinations on a trunked system, a frequency identification code stored in memory 36 may comprise an identification of the unique set of frequencies utilized by this specific trunked system. Methods and apparatus for configuring a scanning radio receiver to utilize such a frequency identification code, in conjunction with a talkgroup code, for selectively receiving communications on that talkgroup during scanned operations are well known to persons of ordinary skill in the art. In such receiver configurations, it is common for the radio receiver to be coupled to a memory containing information identifying sets of broadcast frequencies used by a specific trunked radio system, and containing information regarding which broadcast frequency is presently an active control channel for this trunked system.

Examples of trunked radio systems which may receive a second frequency identification code and secondary identification code stored subject to this method, include the Motorola system which uses a subaudible tone as a secondary identification code, and the EDACS system which uses a talkgroup code as a secondary identification code. In both examples, the stored frequency identification code comprises an identification of the unique set of frequencies utilized by this specific trunked radio system.

Frequency Logging

The present invention may be applied for the logging of active frequencies, where the direct product is not radio reception, but information regarding what frequencies have been active in the region of the frequency determination apparatus. In this case, determined frequencies may be written to a memory, or printed on a monitor or display, but no radio reception equipment is required.

Timecode Memory or Frequency Queue Memory

The combination of a frequency determination apparatus and a frequency memory in a scanning radio receiver makes possible automatic scan list generation and maintenance. This may supplement or replace the conventional means of scan list programming of a scanning radio receiver, i.e., manual entry of individual frequencies via a keypad, or a download of preconfigured scan lists. Automatic scan list generation may improve performance, since any signals sufficiently strong in the user's environment will be monitored, and may improve economy, since relatively expensive user interface elements of a radio receiver may be reduced or eliminated entirely.

When an identification code is stored in memory 36, the radio may also record a timecode representing the current time. This may be a timestamp based on actual clock time, or merely a relative index such as a sequential number, and is generated by a timecode generation apparatus 34. Actual clock time may include, in non-limiting examples, reference to a calendar date, time of day, or elapsed time since a standard reference time. If a frequency newly determined has been previously determined and its corresponding identification code stored, then the timecode associated with that entry may be updated with a current value, so that the most recent time of determination of each frequency determined is recorded. Microprocessor 31 may then delete the oldest entry, or all entries last determined prior to a threshold time, e.g., more than 24 hours ago, or more than 3 months ago. Such delete functions might be triggered by manual command, or automatically, if additional storage space is required, or automatically to maintain a list excluding automatically determined frequencies that do not appear as dominant frequencies in the recently encountered radio frequency environment. Expiration rules triggered by age could cause a radio left inactive for an extended period to delete a substantial portion of its memory due to an absence of recent opportunities for new determinations, so it may be desirable to select a threshold time related to the active time of the radio, for example, by using timecodes based on a clock that runs only when the radio is active. To prevent accidental expiration of specific determined frequencies of interest, it may also be desired to allow a user to make a determined frequency permanent in storage, e.g., make the frequency entry immune from expiration, by keyboard command.

A user may operate the device in a plurality of distinct radio environments, such as two cities. In a variation on the present invention, the memory 36 may be subdivided into a plurality of segments, such that scanning and storage operations are restricted at a given time to specific segments of memory 36. The user may then change active segments when moving between distinct radio environments. Thus, newly determined frequencies will be stored in a memory segment dedicated to the radio environment in which the signal is present, and that memory segment may be scanned to monitor locally active frequencies.

A timecode does not need to be an explicit or literal number, such as would be generated by the timecode generation apparatus 34, but may be implicit in a relative ordering of information. Relative time ordering may be recorded in the memory 36 by the ordering of frequency identification codes in an array or queue within the memory 36. For example, in one implementation, the index of a frequency within an array constitutes a timecode marking the relative time of determination of that frequency with respect to adjacent frequencies in the memory 36. A timecode update upon the determination of a frequency previously determined would then comprise changing the index of the frequency within the array, e.g., storing the frequency at the front end of an array or queue. Similarly, a timecode update may be triggered upon reception of a signal on that frequency detected during a scan of frequencies stored in this memory. In this manner, a queue may be configured to reflect the ordering of either the most recent signal reception via scanning or the most recent signal detection via frequency counter.

A user may also use an input signal, such as a priority button, to indicate that the channel of a particular transmission should be given priority or marked as permanent. Such functions may be achieved by moving the frequency to the top of a queue, giving the frequency a future timestamp that gives it priority for an extended time, marking the frequency as permanent to prevent erasure or queue demotion, or transferring the frequency to a portion of the memory 36 that is not subject to automatic scan list maintenance and channel expiration.

These functions in a radio receiver with concurrent or interlaced i.e., sequential or alternating, scanning and frequency determination make possible, for example, automatic scan list creation and maintenance operations. These lists require minimal or no user intervention. The scan list comprises frequencies that are typically and recently strong and/or active in the user's environment. The operational simplicity of such automatic frequency determination, storage and memory management makes scanning accessible to users who have minimal or no knowledge of agencies, frequencies, or other technical details needed to operate traditional scanners.

The frequency list generation and storage also makes possible the construction of relatively inexpensive radio receivers that monitor communications. Since neither frequency nor channel information needs to be transmitted between the radio circuitry and the user, the input and display means common on such devices, such as keypads and numeric display panels, can be entirely omitted. This reduces device complexity, and can reduce cost. Input and display means may, of course, be provided but devices without such elements are also easily constructed.

Periodic Deletion

If frequencies automatically expire in blocks, such as when the radio is powered off, and the memory 36 is sufficiently large to store all frequencies detected during an operational period, then the maintenance of a queue, timecode, or other relative ordering for the purpose of selective automatic deletion may not be necessary for automatic scan list generation. A process of writing determined frequencies into the memory 36 would be adequate for generating a temporary scan list, and no individual frequencies would need to be selected or relatively prioritized for deletion. In this context, the maintenance of the memory 36 consists of periodic deletion of the entire list.

Common Control of Counting and Scanning Operations

The integration of a frequency determination apparatus and a scanning frequency agile radio receiver into a common housing with a common control architecture, under the control of a microprocessor, provides a number of practical improvements. For example, if these elements share a common bandpass filter, comprised of multiple elements passing limited frequency ranges, two advantages may be realized.

First, if a certain element of bandpass filter 3 is not selected at frequent intervals, dominant signals on frequencies within the frequency range corresponding to that element may not be detectable by the frequency determination apparatus. To improve the reliability of detection and determination, the microprocessor 31 may designate a timer corresponding to some or all of the elements of bandpass filter. Each timer is reset when the corresponding element of bandpass filter is active. Each timer thus indicates elapsed time since a frequency determination was possible in the frequency range corresponding to that element of bandpass filer. The microprocessor 31 may monitor this timer or timers, and select an element of bandpass filter if the corresponding timer exceeds a predetermined time threshold. This element may be left active for at least sufficient time to permit a frequency determination, or until the frequency determination apparatus reports that there is no dominant signal or determinable frequency. Since this process requires that the bandpass filter 3 select an element for a frequency band that would otherwise not have been selected at that time, this window of opportunity for the frequency determination apparatus clearly precludes ordinary scanner operation. For that reason, this practical benefit and reliability improvement is only possible when the frequency determination apparatus and frequency agile radio receiver are under common control.

Second, an in-progress frequency determination becomes invalid if the active element of the bandpass filter is changed, since the radio frequency environment presented to the frequency determination apparatus has been significantly changed with respect to frequency response. Two responses are possible if the frequency determination apparatus and frequency agile radio receiver are under common control. First, the microcontroller 31 may elect to delay the selection of a new element of the bandpass filter until the frequency determination apparatus has completed a frequency determination, or has determined that there is no dominant signal or determinable frequency. Second, the microcontroller 31 may interrupt the frequency determination apparatus, cause any intermediate or partial result to be discarded, and trigger the initiation of a new determination process immediately upon the selection of the new element of the bandpass filter 3. This shift gives the frequency scanning process precedence over the frequency determination process. This approach provides accurate and reliable frequency determination in a frequency range corresponding to an element of the bandpass filter 3 that is only active for a very brief interval during the scanning process, as may be expected when only a small number of frequencies in a given band are present in the active scan list. This careful time coordination would not be possible unless the frequency determination apparatus and the scanning frequency agile radio receiver share a common control system, such as the microprocessor 31.

A common control system permits relative prioritization of active long-distance reception encountered through ordinary operations such as scanning, and near-field detections on frequencies identified by the frequency determination apparatus. For example, the control logic of the radio receiver may be configured to tune immediately to a frequency determined, irrespective of ongoing reception, giving near-field communications priority over ordinary receptions. In another configuration, the radio receiver may be configured to tune only to a determined frequency if there is no ongoing reception, giving the completion of an ongoing reception priority over tuning to a newly determined frequency. Intermediate modes of operation may give some frequencies relative priority, e.g., storing information identifying certain frequencies as high-priority, if determined, to enable immediate reception of certain near-field communications, or storing information identifying certain scanned frequencies as low-priority to prevent delay in retuning if reception is ongoing on a low priority communication. In any configuration where an ongoing reception has priority over tuning to a frequency determined, the control system may elect to ignore reports of the frequency determined for the duration of the ongoing reception, or store a frequency identification code corresponding to the frequency determined for tuning after the ongoing reception is complete, or store a frequency identification code corresponding to the frequency determined for a one-time check for activity after the ongoing reception is complete. These prioritization variations in control logic may be applied regardless of whether the radio is in a scanning mode or a mode in which the scanner stays tuned indefinitely to a single frequency unless there is a manual override or a frequency determined, as observed by the frequency determination apparatus.

Electronic Intelligence

The present invention permits the determination of frequencies that are dominant for only a brief period, due to the validation of frequency stability during a single frequency count period. This rapid frequency determination is useful for reconnaissance operations, such as gathering information about what frequencies are active in a selected geographic region when signal conditions are marginal and provide only a brief window for detection. Examples of such situations are transmissions from portable police devices, aircraft overflights, and satellite electronic intelligence (ELINT) operations. Due to the distance from these transmission sources, directional antenna equipment and/or narrow bandpass filters may be necessary for successful frequency determination.

Strong Signal Status Light/Bug Detector

The present invention may be applied to detect the presence of an unknown radio transmitter. When a stable frequency is observed in an ambient electromagnetic environment, a user indication signal is generated, which may trigger an indication on a monitor, display panel, backlight, audio speaker, vibrator, printout, or status light.

In a basic configuration, the microcontroller 11 monitors the ambient electromagnetic environment for indications of frequency stable transmissions, indicating the presence of a dominant signal. The actual determination of frequency and audio reception of signals on the corresponding channel are not necessary to identify the presence of a transmitter. The user output may be as simple as a single light emitting diode that is illuminated in the presence of a dominant frequency state radio signal. Alternatively, the microcontroller 11 may determine frequency, and apply additional tests, such as a squelch test, to verify a positive indication of a transmitter, or to screen out positive indications from unwanted signals, such as pagers. Such a visible, audible, or tactile indication may be integrated into a complete radio receiver or scanner unit.

This visual indication on a radio scanner that a dominant signal is present functions as a stand-alone "bug detector". Such a bug detector does not require audio circuits or means to report a frequency determined. Rather, it is sufficient to report on the presence of a bug transmitter in close proximity to the detector unit.

If the microcontroller determines a frequency in addition to determining frequency stability, then the signal light indication may be more sophisticated than a simple indication of the presence of an RF signal. Depending on the band, allocated use, or other properties of the determined frequency, the microcontroller may selectively command the illumination or activation of a specific light or display element. Similarly, the microcontroller may inhibit display in response to certain frequencies, or frequencies within certain bands or assigned to certain functions. For example, separate lights might indicate the presence or absence of a dominant signal in each of several bands. Signals outside these bands, such as FM broadcast stations or cellular telephones, or with known functions not of interest to the user, such as pager system transmitters, would not trigger any signal lights.

Compared to conventional bug detector devices, these features give the user more information about potential signals of interest, and provide more selective alert information by screening out detections of common signals not of interest.

Test Equipment

The present invention may also be applied to monitor frequencies of signals from sources other than an ambient electromagnetic environment, for example, in determining the frequency of signals present on a cable or wire. In this case, determined frequencies may be written to a memory, or printed on a monitor or display, but no radio reception equipment is required.

Other Variations

An electronic gating circuit may be used to break periodically the signal path feeding counter modules. Such a circuit may be an external hardware switch, such as a transistor, or an enable/disable control flag within a microcontroller or counter module. The start and end of a sampling period is governed by the positioning of this gating circuit, and the value of the counter module at the end of a sampling period will be static, will not continue to change due to zero amplitude transitions, and may be read at a time of convenience.

The integration of frequency stability verification and frequency determination into a single microprocessor is easiest if the chip has access to two counter modules, so that acquiring counts for the primary and secondary sampling periods remain as essentially parallel activities. However, it is possible to use only a single counter module. As noted above, the counting process for the secondary sampling period can operate without clearing or writing to the counter module, by reading and storing the counter value at the start of a secondary sampling period, and adjusting the result by the stored initial offset from a zero count. In this manner, the count process for the secondary sampling periods can operate by observing a count being accumulated over the primary sampling period, permitting usage of only a single counter module.

Integration is easiest if the chip has access to two free-running timers, so that the ending times of the primary and secondary sampling periods can be identified without regard for the intervening software flow. However, a single free-running timer may be utilized, or even no free-running timer at all. As illustrated in a preferred embodiment, each of the intervals can be timed with a timer register that is decremented by software at regular intervals. It is evident that a single free-running timer watching for the end of the primary sampling period is quite feasible, with the timer register method applied to detect the end of the secondary sampling periods. With careful attention to the number of instruction cycles taken by each program execution path, it is possible to eliminate the need for a free-running timer.

While it is generally desirable to share front end band pass filters between a frequency determining apparatus and other receiver circuits that may be present in the same housing, such as a radio receiver, this sharing is not necessary, and similar frequency determining methods may be used with alternative band pass filters or even no band pass filters at all. This omission may be desirable, for instance, when testing for the presence of signals in bands other than the band that is tuned by a radio receiver and that has priority over the selection of an active band pass filter.

The functions of either or both of frequency stability verification and frequency determination may be integrated with other processing devices in an application unit. In a radio receiver, such as in a preferred embodiment, a candidate for that integration would be the microprocessor.

Integration into a Scanning Process

Preferred embodiments shown here are implemented on a dedicated microcontroller with no other tasks. The present invention may be particularly useful when integrated with a tunable radio receiver, such as a radio scanner tuning a radio receiver, and ordinarily tuning rapidly through a list of channels stored in memory to detect quickly transmissions on these channels. In this context, the use of the present invention may allow the receiver to respond to and receive communications broadcast on arbitrary channels, including channels not on this list previously stored in memory. The integration in software of scanning and frequency determination processes may take special attention, since each operation may require accurate timing and rapid action.

In the described case, there are two specific design considerations. First, if signals in the RF environment are presented to both the tunable radio receiver and the frequency determining apparatus through the same bandpass filter, some degree of coordination may be desirable to ensure adequate scanning and frequency determination performance on multiple bands. Second, if the microcontroller is undertaking tasks related to ordinary radio operations concurrently with a counting process, then the counting process should be designed to operate in the background to the extent possible. Then, the counting process does not monopolize microcontroller activity during a count or handle timing uncertainty arising from an undetermined response time to ISR triggers used in the counting process in some embodiments.

It may be desirable to interlace the scanning and counting operations to maximize the time of each bandpass filter selection, and to minimize the cycling time between revisits to bands, for the counter, and tuned channels, for the scanner. Some count processes may be "background", i.e., secondary, to scanning operations, and some count processes may be "priority", i.e., dominant to scanner operations. The device can always perform background counts, which may be terminated before completion if scanner operations change bandpass filter selection, to perform frequency determinations on a "target of opportunity" basis. To know when a priority count is desirable, the device may maintain a timer to indicate duration since the last count on a particular band. If that timer exceeds a desired value, such as one or two seconds, the radio may select the bandpass filter and initiate a count, unless the radio is performing a higher priority operation such as receiving audio communications on an active channel. During a priority count, the radio can maximize scanner performance by selectively tuning and testing channels that fall within the range of the selected bandpass filter, and then placing these channels at the end of a scanning queue so that other channels are scanned before these tested channels are retested. If a frequency determination fails on a priority count, the radio can be immediately released to perform other tasks, such as counting based on another bandpass filter or scanning of channels in the frequency range of another bandpass filter. Since most counts can be expected to fail quickly, and since dominant signals are most commonly not present, this priority count process can be quite brief and take little processor time. By performing any possible scanning through the selected bandpass filter during this time, the impact on scanning performance is mitigated. Variations are evident, such as triggering a priority count on all bands at regular intervals, which would not require a timer to indicate elapsed time since the last count test through a filter. Some or all background counts can also be performed through a signal path that bypasses the bandpass filters, which would reduce sensitivity for that count on certain frequencies, but improve sensitivity on other frequencies that are outside the selected bandpass filter range. Thus, lower sensitivity counting on all bands would continue even when scanner operations, such as audio reception on an active channel, prevent priority counts that take control of bandpass filter selection.

An integrated microcontroller would ordinarily use an ISR to manage counting operations, instead of using a precision timing loop that takes a precise period of time to execute. The latter method would impose unnecessary and strict restrictions on the design of other operations. Interrupts would occur, if necessary, to maintain a count register, if a free-running counter has insufficient size to maintain an accumulating count directly, but it is desirable to use free-running counter(s) of sufficient size to make such interrupts unnecessary. Interrupts would also occur at the end of sampling periods, for capture of the total count value. To maintain precise timing, the ISR may monitor the corresponding timer register, and delay until a specific value is reached, so that the timing of the end of the sampling period is triggered by software that is free of an uncertainty of the type typical in an ISR. If a timing error for ISR entry is substantially larger, such as may be expected if the microcontroller was performing functions for a higher priority interrupt at the end of a sampling period, then the sample collected may be discarded. For a secondary sampling period, if a slice cannot be tested for validity, it would be presumed acceptable for the purposes of the present invention. For a primary sampling period, the frequency count would be discarded without a frequency determination. In both cases, the result may be salvageable if the result can be scaled in accordance to the proportion between the intended and actual sampling time, or for a secondary sampling period, if the threshold is widened or wide enough to permit such timing variation.

Transceiver Embodiment

Figure 4:
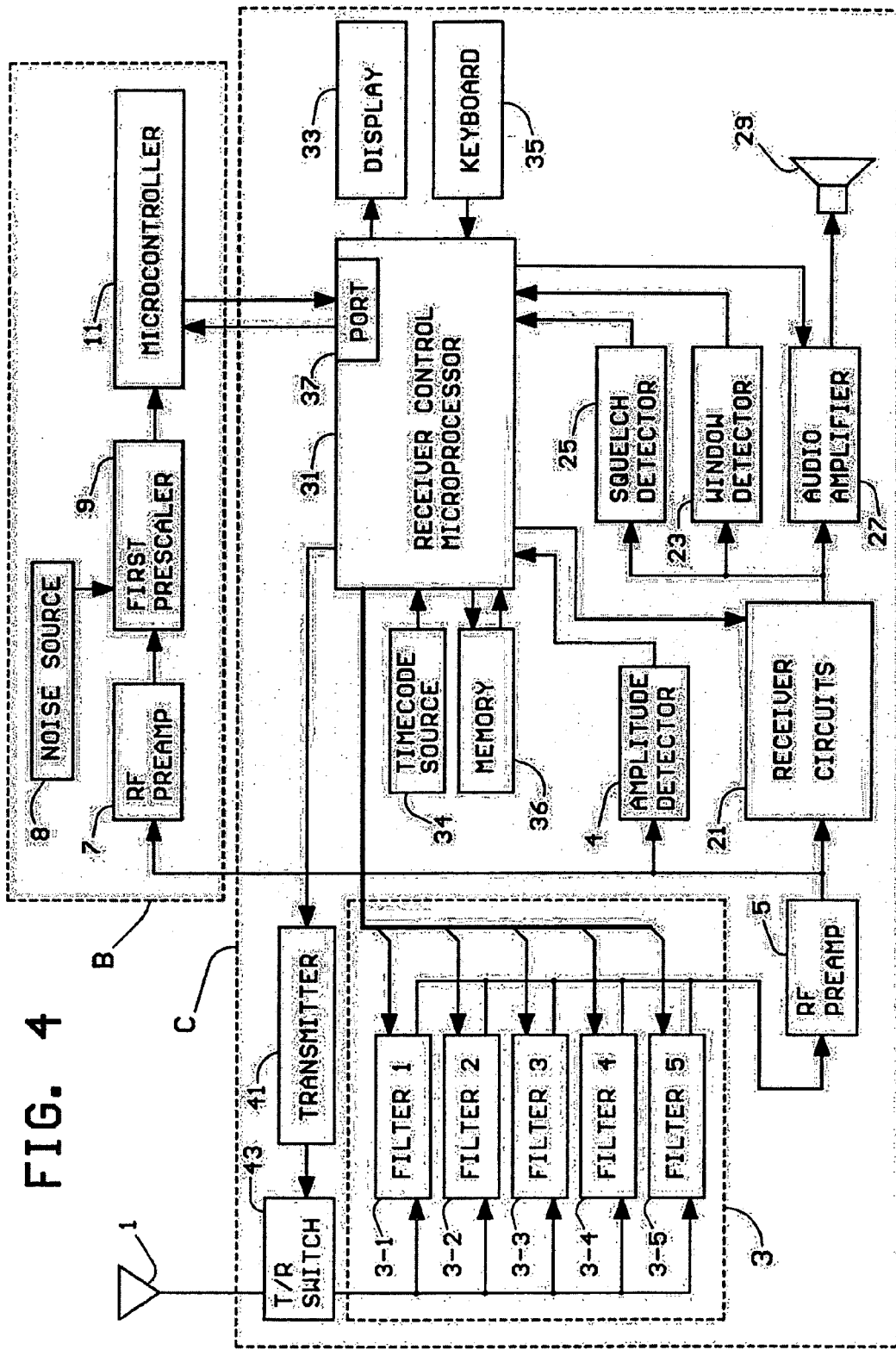
FIG. 4 is a block diagram of a transceiver apparatus according to an embodiment of the invention.

In another aspect of the invention, the radio receiver embodiment of FIG. 1 can be modified to function as a transceiver, as shown in FIG. 4. The radio receiver apparatus A is replaced by a radio transceiver apparatus C including all of the parts of the radio receiver A plus a transmitter 41 connected to the antenna 1 through a transmit/receive switch 43. The transmitter 41 is conventional and is frequency agile, with its tuning being controlled with the same tuning signal supplied by the microprocessor 31 to the receiver circuits 21. When the transmitter 41 is present, upon determination of the frequency of a nearby transmission, both the receiver circuits 21 and the transmitter 41 may be automatically tuned to a channel including the frequency or frequencies (in the event of duplex communication) of communication. In that event, the user of the transceiver can immediately enter into a conversation that is already underway. This feature can be of particular value to EMS, fire, and other rescue personnel.

The invention claimed is:

1. A method of determining stability of frequency and frequency of a frequency-stable electrical signal, the method comprising:
   counting amplitude transitions of an electrical signal during a primary sampling period;
   counting the amplitude transitions of the electrical signal during each of at least two secondary sampling periods, wherein the secondary sampling periods are shorter than the primary sampling period and at least one of the secondary sampling periods partially overlaps, in time, the primary sampling period;
   comparing counts of the amplitude transitions of two of the secondary sampling periods to each other to produce a difference;
   comparing the difference to a threshold and determining that the frequency of the electrical signal is unstable if the difference exceeds the threshold; and
   if the difference does not exceed the threshold, determining the frequency of the electrical signal from an accumulated count of the amplitude transitions accumulated during the primary sampling period.

2. The method of claim 1, wherein, if the difference exceeds the threshold, discarding the counts accumulated during the primary and first and second secondary sampling periods.

3. The method of claim 1, including comparing the counts by subtracting counts being accumulated during a second secondary sampling period of the two of secondary sampling periods from a count accumulated during a first of the two of secondary sampling periods.

4. The method of claim 1, including comparing the counts of two of the secondary sampling periods to each other after expiration of both of the two secondary sampling periods to produce the difference.

5. The method of claim 1, wherein the two secondary sampling periods are of unequal duration, including adjusting the count of at least one of the secondary sampling periods in proportion to respective durations of the two secondary sampling periods.

6. A method of determining stability of frequency and frequency of a frequency-stable signal received from the ambient electromagnetic environment, the method comprising:
   receiving a dominant signal from ambient electromagnetic signals:
   counting amplitude transitions of the dominant signal during a primary sampling period;
   counting the amplitude transitions of the dominant signal during each of at least two secondary sampling periods, wherein the secondary sampling periods are shorter than the primary sampling period and at least one of the secondary sampling periods partially overlaps, in time, the primary sampling period;
   comparing counts of the amplitude transitions of two of the secondary sampling periods to each other to produce a difference;
   comparing the difference to a threshold and determining that the frequency of the dominant signal is unstable if the difference exceeds the threshold; and
   if the difference does not exceed the threshold, determining the frequency of the dominant signal from an accumulated count of the amplitude transitions accumulated during the primary sampling period.

7. The method of claim 6, wherein, if the difference exceeds the threshold, discarding the counts accumulated during the primary and first and second secondary sampling periods.

8. The method of claim 6, including comparing the counts by subtracting counts being accumulated during a second secondary sampling period of the two of secondary sampling periods from a count accumulated during a first of the two of secondary sampling periods.

9. The method of claim 6, including comparing the counts of two of the secondary sampling periods to each other after expiration of both of the two secondary sampling periods to produce the difference.

10. The method of claim 6, wherein the two secondary sampling periods are of unequal duration, including adjusting the count of at least one of the secondary sampling periods in proportion to respective durations of the two secondary sampling periods.

11. The method of claim 6, including storing the frequency determined.

12. The method of claim 6, including tuning a radio receiver to the frequency determined and testing at the frequency determined for a received signal.

13. A method of monitoring signals on established radio frequencies and detecting radio frequency signals on frequencies not being monitored, the method comprising:
   tuning a radio receiver to one of a plurality of established frequencies stored in a data base, to monitor any signals on the established frequency to which the radio receiver is tuned;
   in conjunction with monitoring any signals on the established frequency to which the radio receiver is tuned, detecting a dominant radio frequency signal, and
   counting the amplitude transitions of the dominant radio frequency signal detected during each of at least two secondary sampling periods, wherein the secondary sampling periods are shorter than the primary sampling period and at least one of the secondary sampling periods partially overlaps, in time, the primary sampling period,
   comparing counts of the amplitude transitions of two of the secondary sampling periods to each other to produce a difference, and comparing the difference to a threshold and determining that the frequency of the dominant radio frequency signal detected is unstable if the difference exceeds the threshold, and, if the difference does not exceed the threshold; determining the frequency of the dominant radio frequency signal detected by counting amplitude transitions of the dominant radio frequency signal detected during a primary sampling period, and determining the frequency of the dominant radio frequency signal detected from an accumulated count of the amplitude transitions accumulated during the primary sampling period; and storing the frequency determined in the data base as an established frequency.

14. The method of claim 13, including, upon termination of any signal on the established frequency to which the radio receiver is tuned, tuning the radio receiver to another of the established frequencies stored in the data base, including any frequency determined and added to the data base as an established frequency.

15. The method of claim 14, including adding the frequency determined to the data base as an established frequency with a relative time of reception of a signal on the frequency determined, for prioritizing established frequencies within the data base.

16. The method of claim 13, wherein, if the difference exceeds the threshold, discarding the counts accumulated during the primary and secondary sampling periods.

17. The method of claim 13, including comparing the frequency determined to a stored list of repeater receiving frequencies and, if the frequency determined matches a repeater receiving frequency, offsetting the frequency determined by a fixed offset to a repeater transmitting frequency, and storing the repeater transmitting frequency in the data base as an established frequency.

18. The method of claim 13, including comparing the frequency determined to at least one user-defined frequency range of interest and, if the frequency determined is not within any of the user-defined frequency ranges of interest, discarding the frequency determined.

19. The method of claim 13, including tuning the radio receiver to the frequency determined and testing at the frequency determined.

20. The method of claim 19, including deriving any secondary identification code present from the signal.

21. The method of claim 13, including, upon determining the frequency of a dominant radio frequency signal detected and receiving a user-input lock-out command, storing the frequency determined as a locked-out frequency to be rejected if subsequently detected.

22. A method of monitoring signals on established radio frequencies and detecting radio frequency signals on frequencies not being monitored, the method comprising:

tuning a radio receiver to one of a plurality of established frequencies stored in a data base, to monitor any signals on the established frequency to which the radio receiver is tuned;

in conjunction with monitoring any signals on the established frequency to which the radio receiver is tuned, detecting a dominant radio frequency signal, and counting the amplitude transitions of the dominant radio frequency signal detected during each of at least two secondary sampling periods, wherein the secondary sampling periods are shorter than the primary sampling period and at least one of the secondary sampling periods partially overlaps, in time, the primary sampling period, comparing counts of the amplitude transitions of two of the secondary sampling periods to each other to produce a difference, and comparing the difference to a threshold and determining that the frequency of the dominant radio frequency signal detected is unstable if the difference exceeds the threshold, and, if the difference does not exceed the threshold; determining the frequency of the dominant radio frequency signal detected by counting amplitude transitions of the dominant radio frequency signal detected during a primary sampling period, and determining the frequency of the dominant radio frequency signal detected from an accumulated count of the amplitude transitions accumulated during the primary sampling period; and tuning the radio receiver to the frequency determined and monitoring any signals on the frequency determined.

23. The method of claim 22, including adding the frequency determined to the data base as an established frequency with a relative time of reception of a transmission on the frequency determined, for prioritizing established frequencies within the data base.

24. The method of claim 22, wherein, if the difference exceeds the threshold, discarding the counts accumulated during the primary and secondary sampling periods.

25. The method of claim 22, including comparing the frequency determined to a stored list of repeater receiving frequencies and, if the frequency determined matches a repeater receiving frequency, offsetting the frequency determined by a fixed offset to a repeater transmitting frequency, and tuning the radio receiver to the repeater transmitting frequency.

26. The method of claim 22, including comparing the frequency determined to at least one user-defined frequency range of interest and, if the frequency determined is not within any of the frequency ranges of interest, discarding the frequency determined.

27. The method of claim 22, including tuning the radio receiver to the frequency determined and testing at the frequency determined.

28. The method of claim 27, including deriving any secondary identification code present from the signal.

29. The method of claim 22, including, upon determining the frequency of a radio frequency signal detected and receiving a user-input lock-out command, storing the frequency determined as a locked-out frequency to be rejected if subsequently detected.

30. The method of claim 22, including, upon termination of any transmission on the frequency determined, tuning the radio receiver to another of the established frequencies stored in the data base, including any frequency determined and added to the data base as an established frequency.

31. A method of determining radio frequencies with active signals in the ambient electromagnetic environment and received through an antenna, the method comprising:

a) receiving a dominant radio frequency signal through an antenna;

b) (i) counting the amplitude transitions of the dominant radio frequency signal detected during each of at least two secondary sampling periods, wherein the secondary sampling periods are shorter than the primary sampling period and at least one of the secondary sampling periods partially overlaps, in time, the primary sampling period;

(ii) comparing counts of the amplitude transitions of two of the secondary sampling periods to each other to produce a difference;

(iii) comparing the difference to a threshold and determining that the frequency of the dominant radio frequency signal detected is unstable if the difference exceeds the threshold;

(iv) if the difference does not exceed the threshold, calculating the frequency of the dominant radio frequency signal detected; and (v) counting amplitude transitions of the dominant radio frequency signal during a primary sampling period and calculating the frequency of the dominant radio frequency signal from the amplitude transitions counted during the primary sampling period, as an active non-established radio frequency;

c) tuning a radio receiver to at least one established frequency that is stored in a data base of established frequencies, and testing for a signal on the established frequency to which the radio receiver is tuned, to identify an active established radio frequency; and repeating a), b), and c) to identify a plurality of active non-established radio frequencies and active established radio frequencies.

32. The method of claim 31, including verifying that a calculated frequency of a dominant radio frequency signal is active by tuning the radio receiver to the frequency calculated and testing for a signal at the frequency calculated.

33. The method of claim 31, including storing the active non-established radio frequency in the data base of established frequencies.

34. An apparatus for monitoring signals on established radio frequencies and detecting dominant radio frequency signals on non-established frequencies, the apparatus comprising:

a frequency agile radio receiver;

a memory storing a plurality of established frequencies which are to be monitored by the radio receiver;

a detector for detecting a dominant radio frequency signal in conjunction with monitoring a signal on an established frequency by the radio receiver;

frequency determining means for determining the frequency of the dominant radio frequency signal detected by the detector, the frequency determining means including a first counter for counting amplitude transitions of a dominant radio frequency signal during a primary sampling period, calculation means for determining the frequency of the dominant radio frequency signal from the count accumulated in the first counter, a second counter for counting the amplitude transitions of the dominant radio frequency signal during at least two secondary sampling periods, wherein the secondary sampling periods are shorter than the primary sampling period and at least one of the secondary sampling periods partially overlaps, in time, the primary sampling period, first comparing means for comparing counts of the amplitude transitions of two of the secondary sampling periods to each other to produce a difference, and second comparing means for comparing the difference to a threshold and determining that the frequency of the dominant radio frequency signal is unstable if the difference exceeds the threshold; and a controller for controlling tuning of the radio receiver, operation of the detector and frequency determining means, and storing in the memory of frequencies determined by the frequency determining means.

35. The apparatus of claim 34, comprising a common antenna and at least one bandpass filter commonly used by the radio receiver and the detector.

36. The apparatus of claim 34, comprising a common antenna and a plurality of bandpass filters commonly used by the radio receiver and the detector, wherein the controller selectively connects respective bandpass filters between the antenna and the radio receiver and the detector.

37. The apparatus of claim 34, wherein, if the difference does not exceed the threshold, the second comparing means triggers the calculation means to determine the frequency of the dominant radio frequency signal.

38. The apparatus of claim 34, including a squelch detector testing for a signal at the frequency determined.

* * * * *